US009933976B2

(12) United States Patent
Tsujimoto et al.

(10) Patent No.: US 9,933,976 B2
(45) Date of Patent: Apr. 3, 2018

(54) STORAGE APPARATUS AND DATA PROCESSING METHOD THEREOF, AND STORAGE SYSTEM

(71) Applicant: Hitachi, Ltd., Tokyo (JP)

(72) Inventors: Yoshitaka Tsujimoto, Tokyo (JP); Satoru Watanabe, Tokyo (JP); Yoshiki Kurokawa, Tokyo (JP); Mitsuhiro Okada, Tokyo (JP); Akifumi Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/126,693

(22) PCT Filed: Apr. 28, 2014

(86) PCT No.: PCT/JP2014/061907
§ 371 (c)(1),
(2) Date: Sep. 16, 2016

(87) PCT Pub. No.: WO2015/166540
PCT Pub. Date: Nov. 5, 2015

(65) Prior Publication Data
US 2017/0192718 A1 Jul. 6, 2017

(51) Int. Cl.
*G06F 3/06* (2006.01)
*G06F 11/10* (2006.01)

(52) U.S. Cl.
CPC ............ *G06F 3/0659* (2013.01); *G06F 3/061* (2013.01); *G06F 3/0656* (2013.01); *G06F 3/0688* (2013.01); *G06F 11/1044* (2013.01)

(58) Field of Classification Search
CPC ...... G06F 3/0659; G06F 3/061; G06F 3/0656; G06F 3/0688; G06F 11/1044
See application file for complete search history.

(56) References Cited

U.S. PATENT DOCUMENTS

| 6,480,905 B1 * | 11/2002 | Jesionowski | ......... G06F 3/0605 710/3 |
| 2009/0184826 A1 * | 7/2009 | Kim | ...................... G06Q 10/08 340/572.4 |

(Continued)

FOREIGN PATENT DOCUMENTS

| JP | 2010-128831 A | 6/2010 |
| JP | 2012-014705 A | 1/2012 |

OTHER PUBLICATIONS

International Search Report of PCT/JP2014/061907 dated Jun. 10, 2014.

*Primary Examiner* — Kyle Vallecillo
(74) *Attorney, Agent, or Firm* — Mattingly & Malur, PC

(57) ABSTRACT

A storage apparatus has a plurality of hardware engines which send and receive information to and from a controller, which, on the condition of acquiring a request command from a host, determines identifying information of the request command, executes data I/O processing to the storage device according to the request command when first identifying information has been added to the request command and when second identifying information has been added to the acquired request command, transfers the request command to the hardware engine, acquires the data requested by the hardware engine from the storage device and transfers the acquired data to the hardware engine. The hardware engine acquires and analyzes an add-on command from the host and according to the request command, requests the controller to transfer the data based on the analysis result, and thereafter executes processing to the data transferred by the controller according to the add-on command.

15 Claims, 14 Drawing Sheets

(56) References Cited

U.S. PATENT DOCUMENTS

| | | | |
|---|---|---|---|
| 2011/0252008 A1 | 10/2011 | Chamberlain et al. | |
| 2015/0177994 A1* | 6/2015 | Vucinic | G06F 3/0613 711/103 |
| 2015/0234601 A1* | 8/2015 | Tsai | G06F 3/0611 711/103 |
| 2016/0117100 A1* | 4/2016 | Choi | G06F 3/061 710/5 |
| 2016/0170397 A1* | 6/2016 | Takehisa | G05B 19/05 700/83 |

* cited by examiner

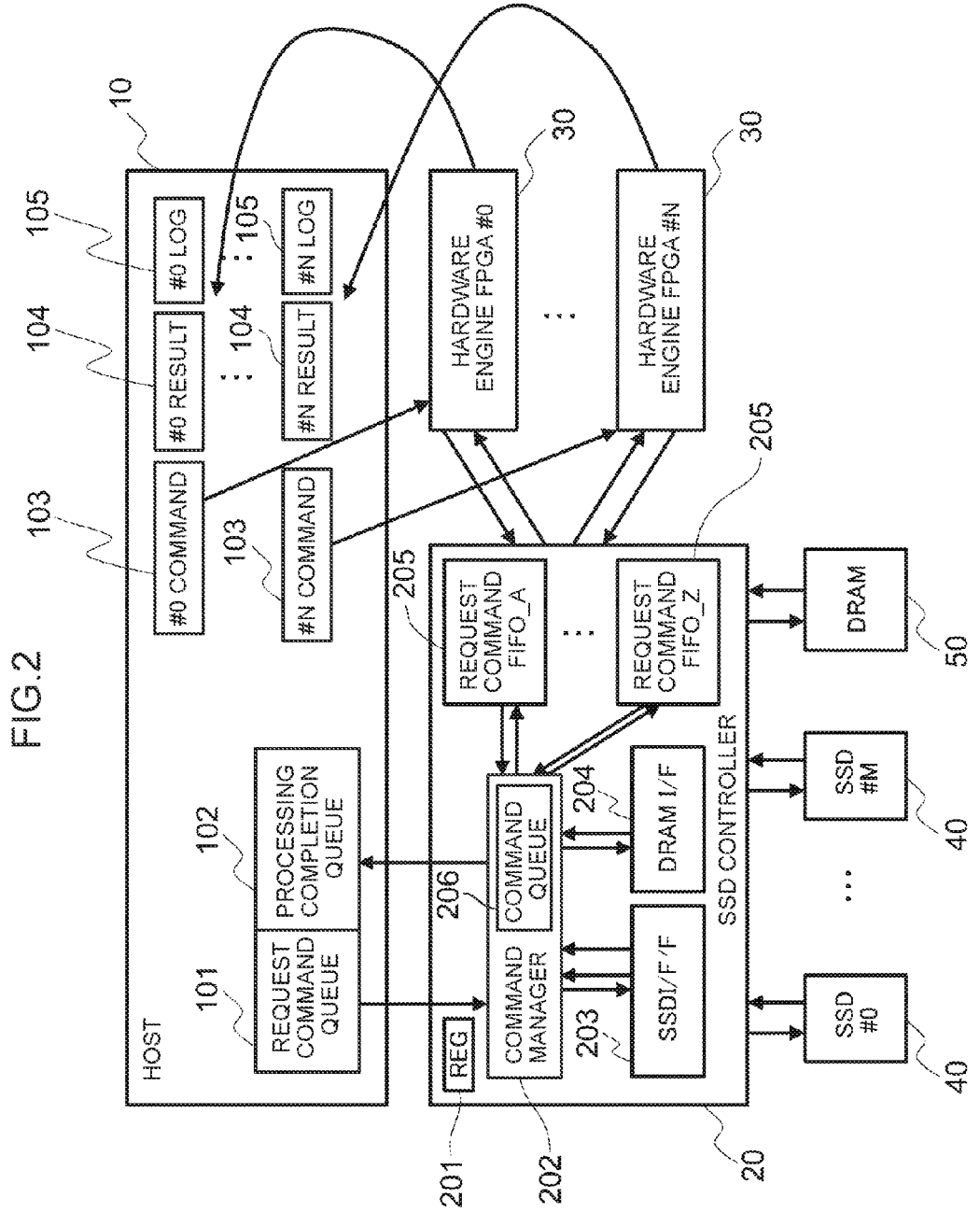

| Bytes | Description |
|-------|-------------|
| 63:04 | Vendor Available — 150 |
| 03:00 | 31:16 Command Identifier(CMDID) — 171<br>15 PRPor SGL for Data Transfer(PSDT) — 172<br>14:10 Reserved — 173<br>09:08 FUSE<br>07:00 Opcode — 174 — 170 |

| Bytes | Description |
|-------|-------------|
| 63:04 | • VERSION OF ADD-ON COMMAND — 151<br>• ADD-ON FUNCTION IDENTIFIER — 152<br>• NUMBER OF ADD-ONs MOUNTED — 153<br>• ADDRESS OF HOST TO STORE ADD-ON COMMAND — 154<br>• SIZE OF ADD-ON COMMAND — 155<br>• ADDRESS OF HOST TO STORE LOG — 156<br>• READ START ADDRESS OF DATA STORED IN SSD — 157<br>• DATA SIZE STORED IN SSD — 158<br>• ENGINE IDENTIFIER — 159 — 150 |
| 03:00 | 31:16 Command Identifier (CMD_ID) — 171<br>15 PRPor SGL for Data Transfer(PSDT) — 172<br>14:10 Reserved<br>09:08 FUSE — 173<br>07:00 Opcode (OPC) — 174 — 170 |

| ERROR NUMBER | ERROR DESCRIPTION |
|---|---|
| 0 | UNSUPPORTED ADD-ON FUNCTION VERSION |
| 1 | COMMAND FLAW |
| 2 | HOST BUFFER OVERFLOW |

STORAGE APPARATUS AND DATA PROCESSING METHOD THEREOF, AND STORAGE SYSTEM

TECHNICAL FIELD

The present invention relates to a storage apparatus which executes data I/O processing to a storage device and data processing to be performed to data obtained from the storage device, as well as to a data processing method thereof, and a storage system.

BACKGROUND ART

With a data processing system as represented by database retrieval processing, the off-loading of a part of the processing performed by the data processing server to a hardware engine disposed near a large capacity storage medium (storage) is being considered for speeding up data processing (PTL 1).

Meanwhile, a hard disk drive (HDD) was predominant as a large capacity storage medium, but the switch to a solid state drive (SSD) is getting underway for improving the reading and writing (READ/WRITE) speed.

An SSD is characterized in being internally equipped with numerous NAND (Not AND)-type flash memories, and commands can be executed in parallel based on specific combinations, and thus the improvement in the read/write performance can be expected.

Nevertheless, when AHCI (Advanced Host Controller Interface), a conventional protocol for an HDD, is applied to an SSD, the maximum number of queues that can be handled with the AHCI is 32 queues. Consequently, with the AHCI, since the maximum number of queues that can be handled is few at 32 queues, there is a problem in that the SSD's attribute of loading commands in multiple queues and executing commands in parallel cannot be leveraged.

Thus, NVMe (Non-Volatile Memory Express) has been formulated as the protocol which gives consideration to the attribute of the SSD, and is now being applied to products. The maximum number of queues that can be managed by the NVMe is 65535 queues, and this specification can sufficiently leverage the attribute of the SSD.

Meanwhile, the connection from a host (host computer) to the SSD is being switched from SATA (Serial Advanced Technology Attachment), which was being used for HDDs, to PCIe (Peripheral Component Interconnect express). While the sequential reading performance is only 6 Gbps with SATA 3.0, the performance is improved to 16 Gbps even in PCIe Gen 4×1 simplex.

When NVMe is used as the protocol to access an SSD, since the PCIe SSD controller will appear to be the same from the OS irrespective of the manufacturer of the PCIe SSD controller, it is possible to access the PCIe SSD of all vendors using one NVMe driver.

Moreover, as a conventional example, in a database retrieval system, known is a technology for improving the retrieval processing performance of a database by providing queues dedicated to database retrieval (PTL 2).

CITATION LIST

Patent Literature

PTL 1: Japanese Laid-Open Patent Application Publication No. 2012-14705

PTL 2: Japanese Laid-Open Patent Application Publication No. 2010-128831

SUMMARY OF THE INVENTION

Problems to be Solved by the Invention

Meanwhile, the database retrieval system described in PTL 2 specializes only in database retrieval, and stores a retrieval request command issued by the host computer in a relay queue dedicated to retrieval, and sequentially executes retrieval according to the retrieval request command stored in the relay queue.

Nevertheless, when building a system which executes data I/O processing according to a request command including a read request or a write request to an SSD and executes database retrieval processing according to the retrieval command, this system needs to be equipped with a queue having a capacity of 64 B as the queue for storing the request command, and equipped with a queue having a capacity of 2 KB as the queue for storing the retrieval command, and it is difficult to manage commands of different sizes with the same queue. Moreover, the retrieval command needs to be provided with processing contents corresponding to a plurality of types of hardware engines to execute data processing, and the retrieval command also needs to be configured in different sizes depending on the function of the hardware engine. Thus, there is no choice but to design the queue having a different capacity for each hardware engine as the queue for storing the retrieval command. In other words, it is difficult to separately manage the request command and the retrieval command and separately execute the data I/O processing to the SSD and the database retrieval processing to the data obtained from the SSD.

Thus, an object of the present invention is to provide a storage apparatus capable of determining the request command and separately executing the data I/O processing to the storage device and the data processing to be performed to data obtained from the storage device, as well as to a data processing method thereof, and a storage system.

Means to Solve the Problems

In order to achieve the foregoing object, the present invention provides a storage apparatus comprising a plurality of storage devices which include a plurality of flash memories for storing data, a controller which controls I/O of data to and from each of the storage devices, and one or more hardware engines which send and receive information to and from the controller, wherein the controller, on the condition of acquiring a request command from a host which manages the request command and one or more add-on commands, determines identifying information which has been added to the acquired request command and executes data I/O processing to the storage device according to the acquired request command when the controller determines that first identifying information has been added to the acquired request command, and, when the controller determines that second identifying information has been added to the acquired request command, transfers the acquired request command to one of the hardware engines based on the acquired request command, thereafter acquires data requested by the hardware engine from the storage device based on the acquired request command, and transfers the acquired data to the hardware engine that made the request, and wherein the hardware engine that received the request command acquires the add-on command designated in the received request command from the host, analyzes the acquired add-on command, requests the controller to transfer data to be subject to processing of the add-on command based on the analysis result, and, upon receiving the data transferred by the controller, thereafter executes data processing to the received data based on the acquired add-on command.

Advantageous Effects of the Invention

According to the present invention, it is possible to determine the request command and separately execute the data I/O processing to the storage device and the data processing to be performed to data obtained from the storage device.

BRIEF DESCRIPTION OF DRAWINGS

FIG. 2 is a configuration diagram of the storage system including the internal configuration of the host and the SSD controller.

FIG. 3 is a configuration diagram of the request command.

FIG. 4 is a configuration diagram of the hardware engine request command.

DESCRIPTION OF EMBODIMENTS

An embodiment of the storage system according to the present invention is now explained based on the appended drawings.

Embodiment 1

Figure 1:
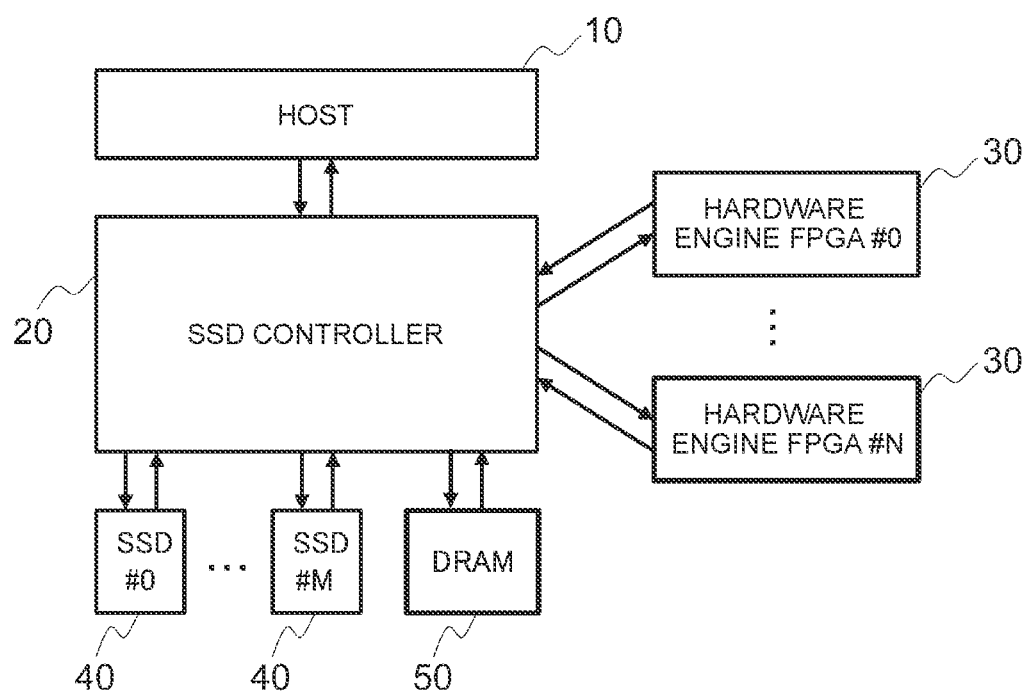
FIG. 1 is a basic configuration diagram showing the first embodiment of the storage system according to the present invention.

FIG. 1 is a basic configuration diagram showing the first embodiment of the storage system according to the present invention. In FIG. 1, the storage system includes, as a storage system comprising an add-on adding mechanism, a host (host computer) 10, an SSD (Solid State Drive) controller 20, a plurality of (#0 to #N) hardware engines 30, a plurality of (#0 to #M) SSDs 40, and a DRAM (Dynamic Random Access Memory) 50, and the respective components are mutually connected via a network or a bus. Note that the SSD controller 20, the respective hardware engines 30, the respective SSDs 40 and the DRAM 50 are configured as storage apparatuses.

The host 10 is a computer device comprising a CPU (Central Processing Unit), a memory, an I/O interface and other information processing resources, and is configured, for instance, from a personal computer, a workstation, or a mainframe. The host 10 separately manages a request command, such as an NVMe command, which is defined according to a protocol (NVMe) for processing the SSD 40, and one or more add-on commands, such as a retrieval command and a graph processing command, which are defined for prescribing the processing which is unique to the hardware engine 30 having an add-on function (function of subsequently adding a program with reinforced functions to an existing program), issues a request command of 64 B (bytes) to the SSD controller 20 in response to an acquisition request from the SSD controller 20, and issues add-on command of 2 KB to each hardware engine 30 in response to an acquisition request from each hardware engine 30.

Here, added to the request command are, for example, one type of identifying information (operation code) of either identifying information (first identifying information) which indicates that the request is a read request or a write request to the SSD 40 or identifying information (second identifying information) which indicates that the request is a command acquisition request to each hardware engine 30, and information which indicates the data read destination or the data write destination and which is the main access information for accessing data.

Note that, when the identifying information (second identifying information) which indicates that the request is a command acquisition request to each hardware engine 30 is added to the request command, added to the request command are first auxiliary access information which can be commonly used by the respective hardware engines 30 and be used by the respective hardware engines 30 for sending and receiving information to and from the host 10, second auxiliary access information which can be used by the SSD controller 20 for determining the respective hardware engines 30, and third auxiliary access information which can be used by the SSD controller 20 for executing data I/O processing to the SSD 40.

The SSD controller 20 is a computer device comprising a CPU, a memory, an I/O interface and other information processing resources, and is configured as a control unit which sends and receives information to and from the host 10 and the respective hardware engines 30, and controls the I/O of data to and from each SSD 40 and the DRAM 50.

Each hardware engine 30 is, for example, a hardware engine having an add-on function, and is configured using FPGA (Field Programmable Gate Array), which is a reconfigurable gate array, and functions as an add-on adding mechanism. Each hardware engine 30 has a processing circuit which processes data and analyzes the add-on command, and is configured, for example, as a database retrieval engine or a graph processing engine.

Each SSD 40 is a storage device for storing data, and is configured from a flash memory. Here, the storage area (data block) of each SSD 40 may also store compressed data in page units. The DRAM 50 is a storage device for storing data, and is configured as a data buffer for temporarily retaining the data read from each SSD 40.

FIG. 2 is a configuration diagram of the storage system including the internal configuration of the host and the SSD controller. In FIG. 2, the memory of the host 10 is provided with a request command queue 101 and a processing completion queue 102 as the queues to be managed by the host 10, and provided with a plurality of (#0 to #N) command storage areas 103, a plurality of (#0 to #N) result areas 104, and a plurality of (#0 to #N) log areas 105 as the areas to be managed by the host 10 and accessed by the respective hardware engines 30.

The request command queue 101 stores a request command, and the processing completion queue 102 stores information indicating the completion of processing of the request command. Each command storage area 103 stores an add-on command which is configured as 2 KB (bytes) and includes a data processing request which prescribes processing that is unique to the hardware engine 30. Each result area 104 stores information indicating the processing result of each hardware engine 30. Each log area 105 stores log information generated by the respective hardware engines 30. Information of #0 to #N is added to the end of the address of each command storage area 103 and each result area 104 and each log area 105, and managed by being associated with the number (#0 to #N) of each hardware engine 30.

The SSD controller 20 includes a door bell register 201, a command manager 202, an SSD interface (I/F) 203, a DRAM interface (I/F) 204, and a plurality of request command FIFOs 205, and the command manager 202 is provided with a command queue 206.

The door bell register 201 is a register for storing a transfer request from the host 10. The command manager 202 includes a CPU which governs the control of the overall SSD controller 20, an interface which sends and receives information to and from the host 10 and each hardware engine 30, and a memory configuring the command queue 206. The command queue 206 is configured to be able to store up to 65535 request commands configured as 64 B (bytes). The CPU of the command manager 202 stores the request command transferred from the host 10 in the command queue 206, and determines the identifying information of the request command stored in the command queue 206.

Here, when it is determined that the identifying information which has been added to the request command transferred from the host 10 is the identifying information (first identifying information) indicating that the request is a read request or a write request to the SSD 40, the CPU executes data I/O processing to the SSD 40 according to the determination result, and transfers the execution result to the host 10. Meanwhile, when it is determined that the identifying information which has been added to the request command transferred from the host 10 is the identifying information (second identifying information) which indicates that the request is a command acquisition request to each hardware engine 30, the CPU identifies the request command FIFO 205 corresponding to the function of each hardware engine 30 based on the information (second auxiliary access information) which has been added to the request command, and sequentially stores, in the identified request command FIFO 205, the request command stored in the command queue 206. Thereafter, the CPU refers to the information (second identifying information) which has been added to the request command and identifies the transfer destination hardware engine 30, reads the request command stored in each request command FIFO 205 in the order that it was stored; that is, in order from the top, transfers the read request command to the identified hardware engine 30, and, upon thereafter receiving a data transfer request as a processing request from each hardware engine 30, executes data I/O processing to the SSD 40 or the DRAM 50 according to the information (third auxiliary access information) which has been added to the request command, and transfers the requested data to the hardware engine 30 as the source (transfer source) of the data transfer request.

The SSD interface 203 is configured as an interface which sends and receives data to and from each SSD 40 according to the instructions of the command manager 202. The DRAM interface 204 is configured as an interface which sends and receives data to and from the DRAM 50 according to the instructions of the command manager 202. Each request command FIFO 205 is configured as a request command buffer which sequentially stores the request command transferred from the command queue 206, and outputs the stored request command in the order that it was stored. Here, each request command FIFO 205 is classified in correspondence with the function of each hardware engine 30. For example, when each hardware engine 30 has two types of functions, each request command FIFO 205 is managed by being classified into two types.

Upon receiving a request command from the command manager 202, each hardware engine 30 analyzes the received request command, activates a DMA (Direct Memory Access) transfer according to the analysis result, acquires an add-on command stored in the designated command storage area 103 from the host 10, and executes processing according to the acquired add-on command. Here, the DMA transfer unit which executes the DMA transfer functions as a command acquisition circuit which refers to the information (first auxiliary access information) which has been added to the request command received from the command manager 202, and acquires the designated add-on command from the command storage area 103 of the host 10.

Here, when the add-on command is database retrieval processing, each hardware engine 30 transfers a data transfer request as the processing request to the command manager 202. The command manager 202 that received the data transfer request reads, for example, data in page units from the SSD 40 based on the information (third auxiliary access information) which has been added to the request command, temporarily retains the read data in page units in the DRAM 50, and transfers the retained data in page units from the DRAM 50 to the hardware engine 30 as the data request transfer source. The hardware engine 30 that received the data executes data processing of analyzing the data (data in page units) transferred from the DRAM 50 and extracting data which satisfies the retrieval conditions among the transferred data (data in page units), and DMA-transfers the processing result and the analysis result of the data processing to the designated result area 104 of the host 10.

By causing data to be retrieved in page units when the hardware engine 30 executes database retrieval processing, it is possible to speed up the database retrieval processing. In the foregoing case, since a plurality of hardware engines 30 having the same function can prevent the DRAM 50 from becoming a bottleneck by executing the database retrieval processing in parallel according to the add-on commands having the same processing contents, it is possible to speed up the database retrieval processing.

Moreover, when generating log information of an error or the like, the hardware engine 30 refers to the information (first auxiliary access information) which has been added to the request command, DMA-transfers the generated log information to the designated log area 105 of the host 10, and DMA-transfers the processing result of the data processing to the designated result area 104 of the host 10. Note that, when the data (data in page units) transferred from the DRAM 50 is compressed data, each hardware engine 30 may also decompress the compressed data in page units, and process the decompressed data (data in page units) as the data to be retrieved.

FIG. 3 is a configuration diagram of the request command. In FIG. 3, the request command 140 includes, for example, a high order area 150 and a low order area 170 are the areas for storing information, and is configured as an NVMe command of 64 B (bytes) overall. The high order area 150 is an information storage area that may be freely used by a vendor, and stores information that is common among the respective hardware engines 30. The low order area 170 is an information storage area for storing the ID (Identification) that is unique to the command or the identifying information of the request command. The low order area 170 stores an ID 171 of the request command, a storage format 172 of the data related to the request command, a FUSE 173, and an operation code (Opcode) 174.

The ID 171 is an identifier that is unique to the request command 140, and the ID 171 is added to each request command 140. PRP (Physical region list) in the data storage format 172 is a page list of physical areas, and an area (data storage destination) where data is being stored. Information recorded in the page list of physical areas becomes access information to be used by the SSD controller 20 upon accessing the SSD 40 in the data I/O processing performed to the SSD 40. Moreover, SGL (Scatter Gather List) in the data storage format 172 shows the data structure of the memory address space. In this embodiment, PRP is used. Since the FUSE 173 is not used, the explanation thereof is omitted.

The operation code (Opcode) 174 is identifying information for identifying whether the request command 140 is a command requesting the data I/O processing (data read processing or data write processing) to the SSD 40 or a command requesting the processing (database retrieval processing) to be performed by each hardware engine 30, and is identifying information for identifying the type of request command. In other words, when the request command is a command requesting the data I/O processing to the SSD 40, the identifying information (first identifying information) which indicates that the request is a read request or a write request to the SSD 40 is added to the operation code 174. Meanwhile, when the request command is a command requesting the processing to be performed by each hardware engine 30, the identifying information (second identifying information) which indicates that the request is a command acquisition request to each hardware engine 30 is added to the operation code 174.

FIG. 4 is a configuration diagram of the hardware engine request command. In FIG. 4, the request command 140 is configured as a hardware engine request command, and the high order area 150 of the request command 140 stores information that is common to the respective hardware engines 30.

In other words, added to the request command 140 to which has been added the identifying information which indicates that the request is a command acquisition request to each hardware engine 30 are the first auxiliary access information which can be commonly used by the respective hardware engines 30 and be used by the respective hardware engines 30 for sending and receiving information to and from the host 10, the second auxiliary access information which can be used by the SSD controller 20 for determining the respective hardware engines 30, and the third auxiliary access information which can be used by the SSD controller 20 for acquiring the data requested from each hardware engine 30.

Specifically, the high order area 150 of the request command 140 stores an add-on command version 151, an add-on function identifier 152, a number of add-on functions mounted 153, an address (add-on command storage host address) 154 of the host 10 storing the add-on command, a size of the add-on command (add-on command size) 155, an address (log storage host address) 156 of the host 10 storing the log, a read start address 157 of data stored in the SSD 40, a size 158 of the data stored in the SSD 40, and an engine identifier 159 for identifying each hardware engine 30.

The add-on command version 151, the address (add-on command storage host address) 154 of the host 10 storing the add-on command, the size of the add-on command (add-on command size) 155 and the address (log storage host address) 156 of the host 10 storing the log are configured as the first auxiliary access information; the add-on function identifier 152, the number of add-on functions mounted 153 and the engine identifier 159 are configured as the second auxiliary access information, and the read start address 157 of data stored in the SSD 40 and the size 158 of the data stored in the SSD 40 are configured as the third auxiliary access information.

The add-on command version 151 describes the add-on command version stored in each command storage area 103 of the host 10. The add-on command version is compared with the version of each hardware engine by the respective hardware engines 30. The add-on function identifier 152 is an identifier for classifying each request command FIFO 205, and describes information corresponding to the function of each hardware engine 30. The command manager 201 determines the distribution destination or the transfer destination based on the identifier described in the add-on function identifier 152 upon distributing the request command to one of the request command FIFOs 205 or upon transferring the request command to one of the hardware engines 30. Note that, when it is not possible to determine the transfer destination of the request command based on the add-on function identifier 152, the command manager 201 determines the transfer destination of the request command based on the engine identifier 159.

The number of add-on functions mounted 153 describes information regarding how many hardware engines to be connected to the SSD controller 20 are mounted. This information is used when the command manager 202 decides the number of request command FIFOs 205 to be secured. The address 154 of the host 10 storing the add-on command describes the address which identifies the command storage area 103 of the host 10. The add-on command size 155 describes the size of the add-on command stored in each command storage area 103 of the host 10. This information regarding the size of the add-on command is used when each command manager 202 sets the data size to be acquired in the DMA transfer.

The address 156 of the host 10 storing the log describes the address which identifies each log area 105 of the host 10. This address is used when each command manager 202 transfers the log information to the host 10 via DMA transfer. The read start address 157 of the data stored in the SSD 40 describes the start address of the SSD 40 storing the data to be processed in the database retrieval processing. The data size 158 stored in the SSD 40 describes the size of the data stored in the SSD 40 and which is to be processed in the database retrieval processing.

Here, in the low order area 170 of the hardware engine request command 140, the operation code 174 records identifying information which indicates that the request command 140 is a hardware engine request command; that is, identifying information which indicates that the request command is a command requesting the processing to be performed by each hardware engine 30 and a command acquisition request to each hardware engine 30.

Figure 5:
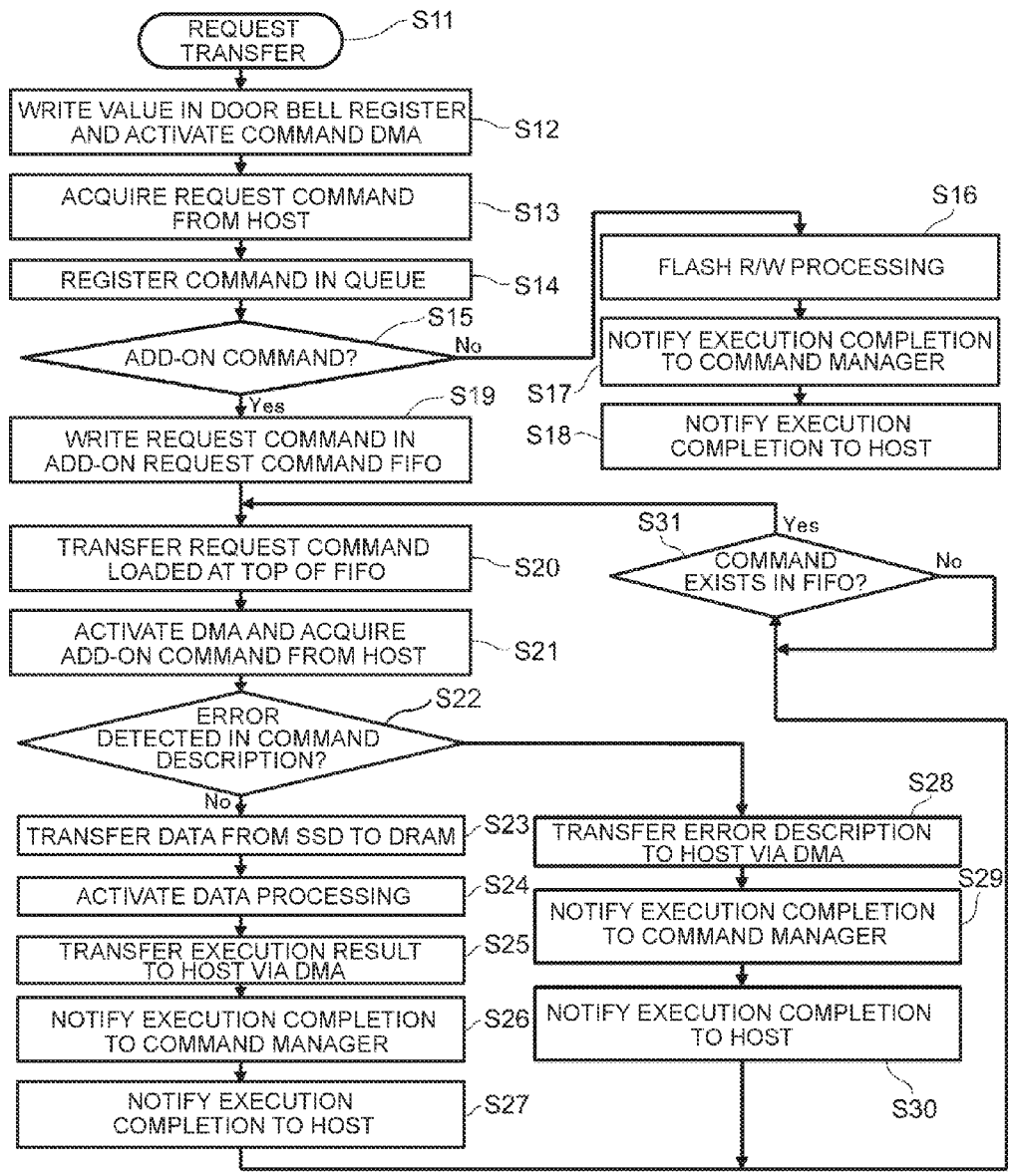
FIG. 5 is a flowchart explaining the processing of the storage system.

FIG. 5 is a flowchart explaining the processing of the storage system. This processing is started by the host 10 issuing a transfer request to the SSD controller 20. Here, in the low order area 170 of the hardware engine request command 140, the operation code 174 records identifying information which indicates that the request command 140 is a hardware engine request command; that is, identifying information (second identifying information) which indicates that the request command is a command requesting the processing to be performed by each hardware engine 30 and a command acquisition request to each hardware engine 30.

In FIG. 5, the host 10 issues a transfer request to the SSD controller 20 (S11), writes the value of the transfer request in the door bell register 201 of the SSD controller 20, and activates the command DMA (S12). When the command DMA is activated, the command manager 202 acquires the request command (NVMe command) 140 stored in the request command queue 101 from the host 10 via the command DMA (S13), and registers the acquired request command 140 in the command queue 206 (S14). Thereafter, the command manager 202 determines the operation code 174 of the request command 140 registered in the command queue 206, and determines whether the request command 140 is an add-on command (hardware engine request command 140) (S15).

When the command manager 202 obtains a negative determination result in step S15; that is, when the request command 140 is not an add-on command, the command manager 202 executes data I/O processing (data read processing or data write processing) to the SSD 40 based on the data storage destination recorded in the data storage format 172 in the low order area 170 of the request command 140 (S16). When the data I/O processing is complete, the completion of the execution of the data I/O processing is notified from the SSD interface 203 to the command manager 202 (S17). Thereafter, the command manager 202 notifies the host 10 that the processing requested in the request command 140 is complete (S18), and then ends the processing of this routine.

Meanwhile, when the command manager 202 obtains a positive determination result in step S15; that is, when the request command 140 is an add-on command (hardware engine request command 140), the command manager 202 determines the add-on function identifier 152 in the high order area 150 of the request command 140, identifies the request command FIFO 205 to become the distribution destination of the request command 140 based on the determination result by associating it with the function of each hardware engine 30, and writes the request command 140 in the identified request command FIFO 205 (S19). Thereafter, the command manager 202 transfers the request command 140, which is loaded at the top among the request commands 140 written in the request command FIFO 205, to the hardware engine (FPGA) 30 having the function corresponding to the add-on function identifier 152 (S20).

The hardware engine 30 that received the request command 140 activates the DMA, acquires, from the host 10, the add-on command stored in the command storage area 103 of the host 10 based on the address 154 of the host 10 storing the add-on command in the high order area 150 of the request command 140 (S21), analyzes the contents of the acquired add-on command, and determines whether an error was detected in the contents of the add-on command, such as a problem with the setting (S22).

When the hardware engine 30 that received the add-on command obtains a negative determination result in step S22; that is, when no error was detected in the contents of the acquired add-on command, the hardware engine 30 transfers to the command manager 202 a transfer request (data transfer request) of the data required for the processing, such as database retrieval processing, to be performed according to the contents of the acquired add-on command. The command manager 202 that received the data transfer request refers to the read start address 157 of data stored in the SSD 40 and the data size 150 of the SSD 40 in the high order area 150 of the request command 140, reads the data (data in page units) from one of the SSDs 40, transfers the read data to the DRAM 50, temporarily retains the transferred data in the DRAM 50, and thereafter transfers the data (data in page units) retained in the DRAM 50 to each hardware engine 30 as the transfer source (request source) of the data transfer request (S23).

The hardware engine 30 that received the data transferred from the DRAM 50 activates data processing, executes database retrieval processing according to the contents of the add-on command (S24), transfers the execution result to the DMA of the result area 104 of the host 10 (S25), and thereafter notifies the command manager 202 of the completion of execution of the request command 140 (S26).

The command manager 202 that received the execution completion notice of the request command 140 notifies the host 10 of the completion of execution of the request command 140 (S27). Consequently, information regarding the completion of execution of the request command 140 is stored in the processing completion queue 102 of the host 10.

Meanwhile, when a positive determination result is obtained in step S22; that is, when an error is detected in the contents of the acquired add-on command, the hardware engine 30 that detected an error in the contents of the acquired add-on command generates log information indicating the contents of the error of the add-on command, transfers the generated log information to the log area 105 of the host 10 via DMA (S28), notifies the command manager 202 that the execution of the processing of the request command 140 was completed based on an error, and stores the processing completion notice in the processing completion queue 102 (S29). Thereafter, the command manager 202 notifies the host 10 that the execution of the processing requested in the request command 140 was completed based on an error (S30). In the foregoing case, the host 10 refers to the log information stored in the log area 105, confirms the contents of the error, corrects the error location of the add-on command stored in the command storage area 103, thereafter resends the transfer request to the SSD controller 20 in order to reenter the request command 140, and then reissues the hardware engine request command 140 in response to the acquisition request from the SSD controller 20.

After step S27 or step S30, the command manager 202 determines whether a request command exists in each request command FIFO 205 (S31), and, if a request command exists in each request command FIFO 205, returns to the processing of step S20 and repeats the processing of steps S20 to S31, and, if a request command does not exist in each request command FIFO 205, ends the processing of this routine.

According to this embodiment, it is possible to separately execute the data I/O processing to the SSD 40 and the data processing (database retrieval processing) to be performed to the data obtained from the SSD 40 by determining the request command 140. Moreover, according to this embodiment, since the host 10 is separately managing the request command 140 defined according to the NVMe standard protocol and the add-on command which prescribes processing that is unique to each hardware engine, the extensibility of add-on commands can be improved. Furthermore, since the request command 140 defined according to the NVMe standard protocol is configured as a capacity of 64 B, the command queue 206 can store up to 65535 request commands 140, and, consequently, the processing of the respective request commands 140 stored in the command queue 206 can be executed in parallel, and the performance of the SSD 40 can thereby be improved.

Moreover, since a plurality of request commands 140 of 64 B can be stored in one command queue 206, the hardware design of the SSD controller 20 can be facilitated, and the size of the command queue can be reduced in comparison to the case of adopting a configuration of arranging two types of command queues. Moreover, since information is sent and received to and from the host 10 and each hardware engine 30 via DMA transfer, the load of the CPU of the host 10 can be reduced.

Embodiment 2

In this embodiment, when there are three hardware engines 30 having the same function, the SSD controller 20 manages the request commands 140 with one request command FIFO 205.

Figure 6:
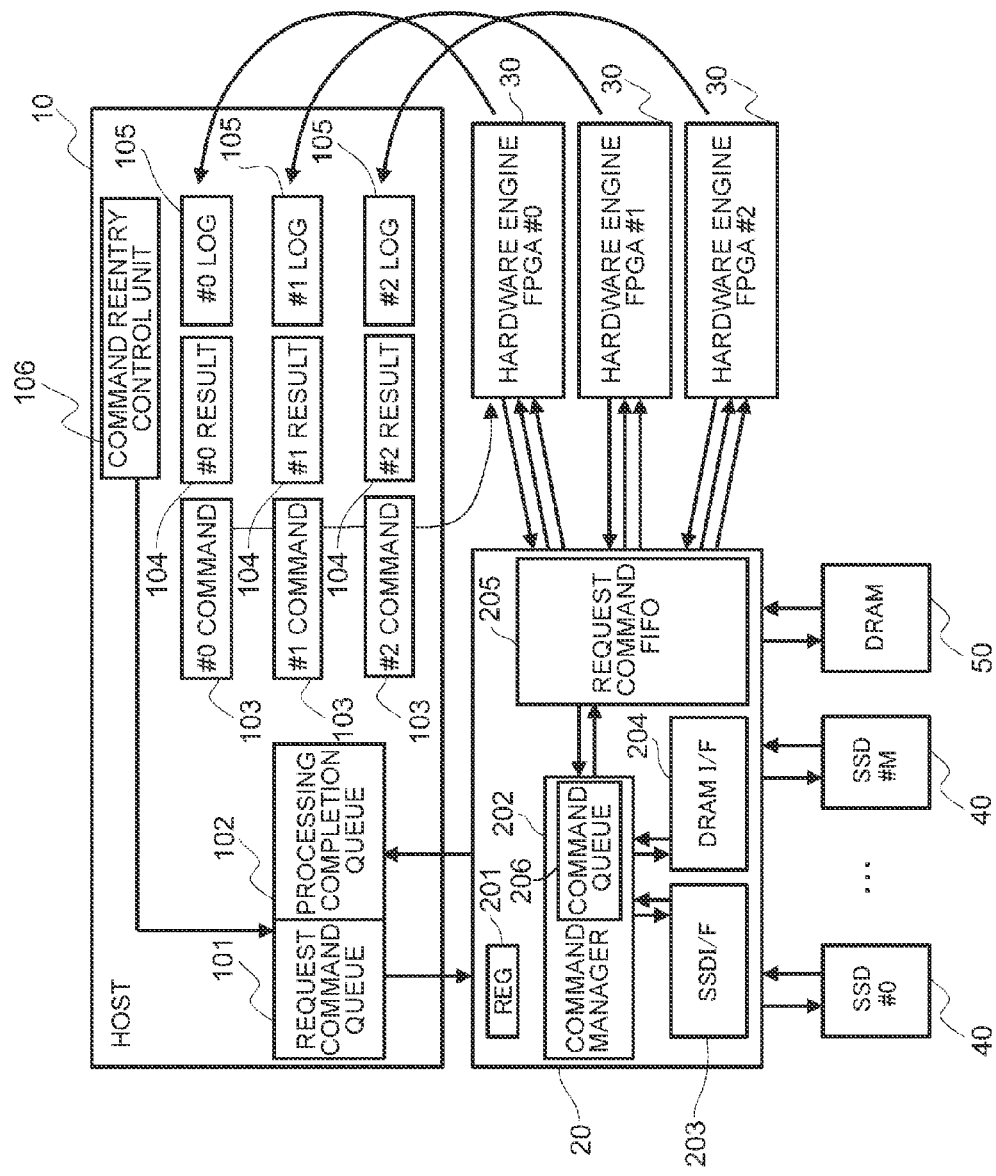
FIG. 6 is a configuration diagram showing the second embodiment of the storage system according to the present invention.

FIG. 6 is a configuration diagram showing the second embodiment of the storage system according to the present invention. In FIG. 6, the storage system according to this embodiment has three (#0 to #2) hardware engines 30 having the same function as the hardware engines.

Here, in correspondence to three hardware engines 30, the host 10 is provided with #0 to #2 command storage areas 103, #0 to #2 result areas 104, and #0 to #2 log areas 105, and the SSD controller 20 is provided with one request command FIFO 205 for managing the three hardware engines 30 having the same function, but the remaining configuration is the same as Embodiment 1. Information of #0 to #2 is added to the end of the address of each command storage area 103 and each result area 104 and each log area 105, and managed by being associated with the number (#0 to #2) of each hardware engine 30. Moreover, the SSD controller 20 and each hardware engine 30 may also be connected via a dedicated path. Moreover, the host 10 is provided with a command reentry control unit 106 for controlling the reentry of the command 140.

When the request command 140 acquired from the host 10 is an add-on command (hardware request command), the command manager 202 determines the add-on function identifier 152 in the high order area 150 of the request command 140, identifies one request command FIFO 205 as the transfer destination of the request command 140 based on the determination result, writes the request command 140 in the identified one request command FIFO 205, and sequentially transfers to one of the hardware engines (FPGA) 30, via a dedicated path, in order from the request command 140 which is loaded at the top among the request commands 140 written in the request command FIFO 205.

The hardware engine 30 that received the request command 140 activates the DMA, acquires, from the host 10, the add-on command stored in the command storage area 103 of the host 10 based on the address 154 of the host 10 storing the add-on command in the high order area 150 of the request command 140, analyzes the contents of the acquired add-on command, and determines whether an error was detected in the contents of the add-on command, such as a problem with the setting.

When the hardware engine 30 that received the add-on command did not detect an error in the contents of the acquired add-on command, the hardware engine 30 requests the command manager 202 to transfer the data required for the processing, such as database retrieval processing, to be performed according to the contents of the acquired add-on command. In the foregoing case, the command manager 202 that received the data transfer request refers to the read start address 157 of data stored in the SSD 40 and the data size 150 of the SSD 40 in the high order area 150 of the request command 140, reads the data from one of the SSDs 40, transfers the read data to the DRAM 50, temporarily retains the transferred data in the DRAM 50, and thereafter transfers the data retained in the DRAM 50 to each hardware engine 30 as the transfer source (source) of the data transfer request.

The hardware engine 30 that received the data transferred from the DRAM 50 activates data processing, executes database retrieval processing according to the contents of the add-on command, transfers the execution result to the result area 104 of the host 10 via DMA, and thereafter notifies the command manager 202 of the completion of execution of the request command 140. The command manager 202 that received the execution completion notice of the request command 140 notifies the host 10 of the completion of execution of the request command 140.

Meanwhile, when an error is detected in the contents of the acquired add-on command, the hardware engine 30 that detected an error in the contents of the acquired add-on command generates log information indicating the contents of the error of the add-on command, transfers the generated log information to the log area 105 of the host 10 via DMA, and notifies the command manager 202 that the execution of the processing of the request command 140 was completed based on an error. Thereafter, the command manager 202 notifies the host 10 that the execution of the processing requested in the request command 140 was completed based on an error. In the foregoing case, the command reentry control unit 106 of the host 10 refers to the log information stored in the log area 105, confirms the contents of the error, corrects the error location of the add-on command stored in the command storage area 103, thereafter resends the transfer request to the SSD controller 20 as the processing for reentering the hardware engine request command 140, and then reissues the hardware engine request command 140 in response to the acquisition request from the SSD controller 20.

Figure 7:
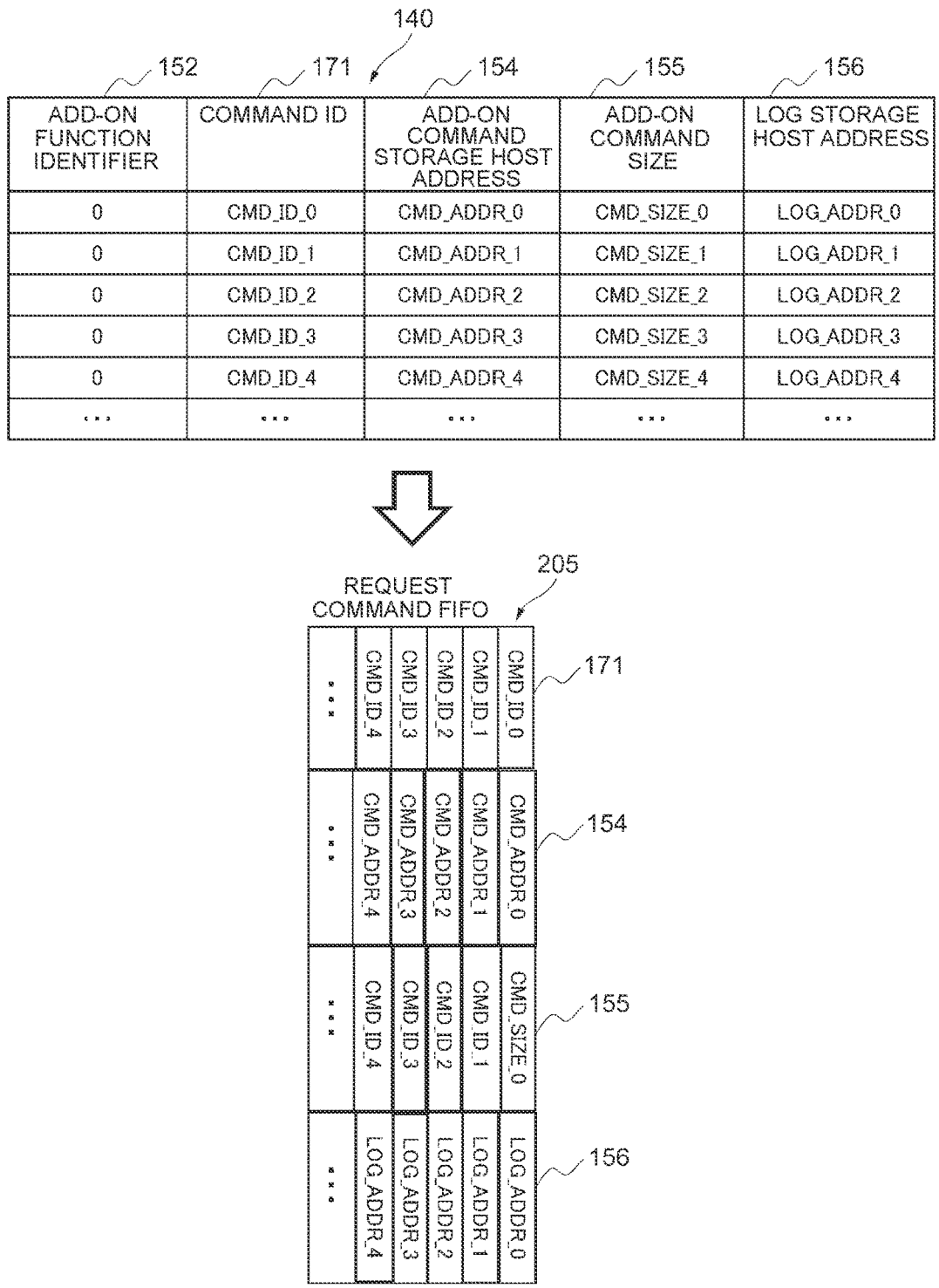
FIG. 7 is a conceptual diagram explaining the configuration of the hardware engine request command and the request command FIFO.

FIG. 7 is a conceptual diagram explaining the configuration of the hardware engine request command and the request command FIFO.

In FIG. 7, when the host 10, for instance, is to sequentially issue the #0 to #2 request commands 140 as the request command (hardware engine request command) to the three hardware engines 30 having the same function, "0" is added to the add-on function identifier 152 of the #0 to #2 request commands 140 as information indicating that the respective hardware engines 30 have the same function.

Moreover, among the #0 to #2 request commands 140, information that is unique to the #0 to #2 request commands 140 and which identifies each request command 140 is added to the command ID 171, and "0" to "2" is added to the end of the command ID 171. Similarly, "0" to "2" is added to the end of the address of the address 154 of the add-on command storage host as information which identifies the address of the #0 to #2 command storage areas 103, "0" to "2" is added to the end of the size of the add-on command size 155 as information which identifies the size of the #0 to #2 add-on commands, and "0" to "2" is added to the end of the address of the log storage host address 156 as information which identifies the address of the #0 to #2 log areas 105.

The request command 140 received by the command manager 202 is written in the request command FIFO 205 in the order that it was received. For example, when the command manager 202 receives the #0 to #2 request commands 140 in the order of #0 to #2, the request command 140 is written in the request command FIFO 205 in order from the #0 request command 140. The request command 140 written in the request command FIFO 205 is transferred to each hardware engine 30 in the order of #0 to #2. For instance, the #0 request command 140 is foremost transferred to the #0 hardware engine 30, the #1 request command 140 is then transferred to the #1 hardware engine 30, and the #2 request command 140 is thereafter transferred to the #2 hardware engine 30.

Figure 8:
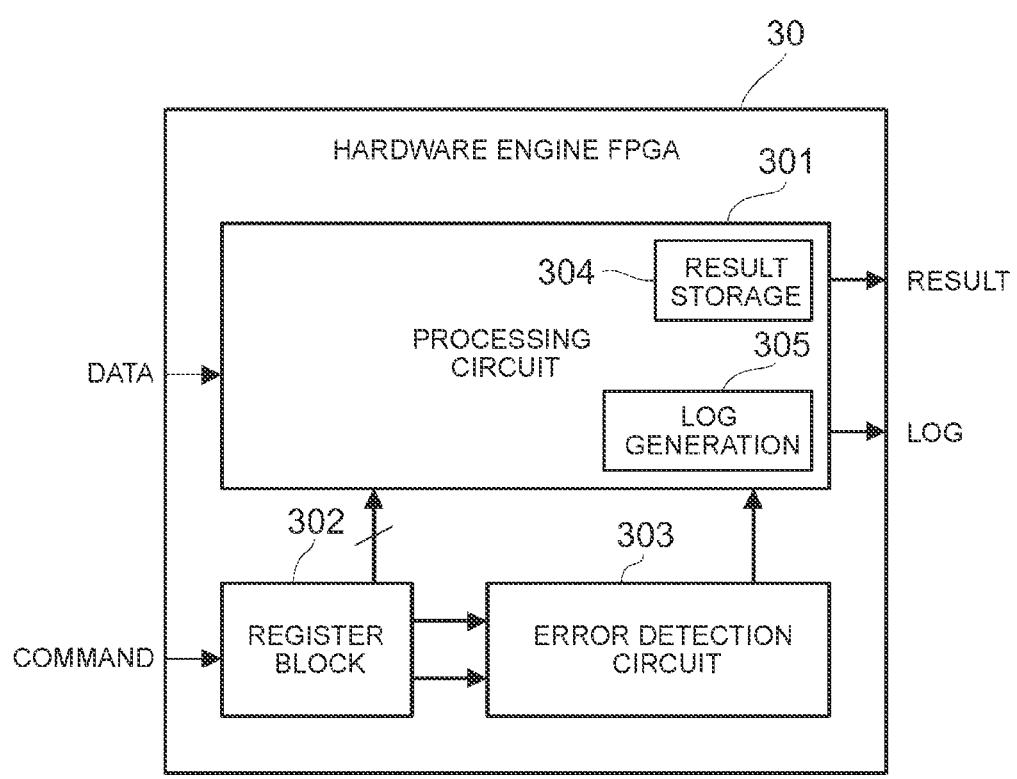
FIG. 8 is a configuration diagram of the hardware engine.

FIG. 8 is a configuration diagram of the hardware engine. In FIG. 8, each hardware engine 30 is configured from, in addition to a CPU which governs the control of the overall hardware engine 30 and an interface which sends and receives data and commands to and from the SSD controller 20 and the host 10, a processing circuit 301 which executes data processing, such as database retrieval processing or graph processing, which is unique to each hardware engine 30, a register block 302 which stores the add-on commands acquired from the host 10 and the request commands 140 transferred from the SSD controller 20, and an error detection circuit 303 which detects whether there is an error in the contents of the add-on command or the request command 140 stored in the register block 302. The processing circuit 301 is provided with a result storage unit 304 for storing the processing result of the processing circuit 301, and a log generation unit 305 for generating log information.

The processing circuit 301 analyzes the contents of the add-on command or the request command 140 stored in the register block 302, and executes data processing according to the analysis result. Here, the processing circuit 301 executes database retrieval processing or graph processing based on the data transferred from the DRAM 50. When there is an error in the contents of the add-on command stored in the register block 302, the log generation unit 305 generates the contents of the error as log information, and generates log information related to the data that cannot be processed by the processing circuit 301.

According to this embodiment, in addition to being able to yield the same effects as Embodiment 1, when there are three hardware engines 30 having the same function, the SSD controller 20 can manage the request commands 140 with one request command FIFO 205.

Embodiment 3

In this embodiment, when there is a hardware engine 30 having two types of functions, the SSD controller 20 manages the request commands 140 with two types of request command FIFOs 205.

Figure 9:
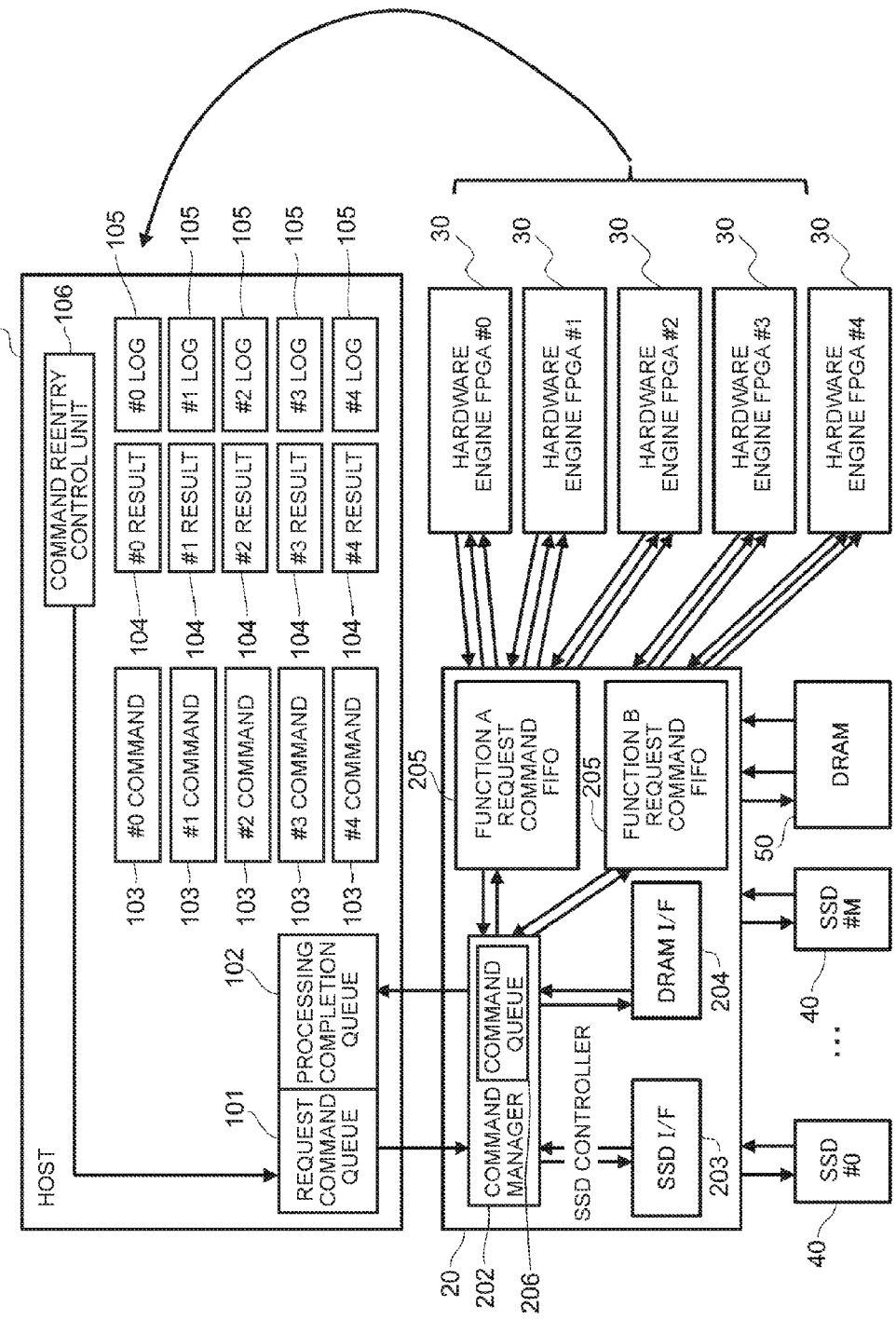
FIG. 9 is a configuration diagram showing a third embodiment of the storage system according to the present invention.

FIG. 9 is a configuration diagram showing a third embodiment of the storage system according to the present invention. In FIG. 9, the storage system according to this embodiment has five (#0 to #4) hardware engines 30 having two types of functions (#A, #B) as the hardware engines.

Here, in correspondence to five hardware engines 30, the host 10 is provided with #0 to #4 command storage areas 103, #0 to #4 result areas 104, and #0 to #4 log areas 105, and the SSD controller 20 is provided with two types (#A, #B) of request command FIFOs 205 for managing the request command 140 to the five hardware engines 30 having two types of functions (#A, #B), but the remaining configuration is the same as Embodiment 1. Note that information of #0 to #4 is added to the end of the address of each command storage area 103 and each result area 104 and each log area 105, and managed by being associated with the number (#0 to #4) of each hardware engine 30. Moreover, the host 10 is provided with a command reentry control unit 106 for controlling the reentry of the command 140.

When the request command 140 acquired from the host 10 is an add-on command (hardware request command), the command manager 202 determines the add-on function identifier 152 in the high order area 150 of the request command 140, identifies the request command FIFO 205 belonging to one of the functions of a plurality of request command FIFOs 205, which are provided by being separated into two types of functions, as the distribution destination of the request command 140 based on the determination result, and writes the request command 140 in the request command FIFO 205 of the identified function.

For example, when the command manager 202 identifies the request command FIFO 205 belonging to one function (#A) as the distribution destination of the request command 140, the command manager 202 writes the request command 140 in the request command FIFO 205 belonging to the identified one function (#A). Meanwhile, when the command manager 202 identifies the request command FIFO 205 belonging to the other function (#B) as the distribution destination of the request command 140, the command manager 202 writes the request command 140 in the request command FIFO 205 belonging to the identified other function (#B).

Thereafter, when the request command 140 loaded at the top among the request commands 140 written in the #A request command FIFO 205 is to be transferred to the hardware engine (FPGA) 30, the command manager 202 selects the hardware engine 30 designated with the engine identifier 159 recorded in the high order area 150 of the request command 140 among the hardware engines 30 belonging to the #A function, and transfers the request command 140 to the selected hardware engine 30. For example, when the hardware engine 30 designated with the engine identifier 159 is the #0 hardware engine 30, the command manager 202 selects the #0 hardware engine 30 among the #0, #2, #3 hardware engines 30, and transfers the request command 140 to the #0 hardware engine 30.

Meanwhile, when the request command 140 loaded at the top among the request commands 140 written in the #B request command FIFO 205 is to be transferred to the hardware engine (FPGA) 30, the command manager 202 selects the hardware engine 30 designated with the engine identifier 159 recorded in the high order area 150 of the request command 140 among the hardware engines 30 belonging to the #B function, and transfers the request command 140 to the selected hardware engine 30. For example, when the hardware engine 30 designated with the engine identifier 159 is the #1 hardware engine 30, the command manager 202 selects the #1 hardware engine 30 among the #1, #4 hardware engines 30, and transfers the request command 140 to the #1 hardware engine 30.

The hardware engine 30 that received the request command 140, for instance, the #0 hardware engine 30, activates the DMA, acquires, from the host 10, the add-on command (#0 add-on command) stored in the command storage area (#0 command storage area) 103 of the host 10 based on the address 154 of the host 10 storing the add-on command in the high order area 150 of the request command 140, analyzes the contents of the acquired add-on command (#0 add-on command), and determines whether an error was detected in the contents of the add-on command (#0 add-on command), such as a problem with the setting.

When the #0 hardware engine 30 did not detect an error in the contents of the acquired add-on command (#0 add-on command), the #0 hardware engine 30 requests the command manager 202 to transfer the data required for the processing, such as database retrieval processing, to be performed according to the contents of the acquired add-on command. In the foregoing case, the command manager 202 that received the data transfer request refers to the read start address 157 of data stored in the SSD 40 and the data size 150 of the SSD 40 in the high order area 150 of the request command 140, reads the data from one of the SSDs 40, transfers the read data to the DRAM 50, temporarily retains the transferred data in the DRAM 50, and thereafter transfers the data retained in the DRAM 50 to the #0 hardware engine 30 as the data transfer request source.

The hardware engine (#0 hardware engine) 30 that received the data transferred from the DRAM 50 activates data processing, executes database retrieval processing according to the contents of the add-on command, transfers the execution result to the result area (#0 result area) 104 of the host 10 via DMA, and thereafter notifies the command manager 202 of the completion of execution of the request command 140. The command manager 202 that received the execution completion notice of the request command 140 notifies the host 10 of the completion of execution of the request command 140.

Meanwhile, when an error is detected in the contents of the acquired add-on command (#0 add-on command), the #0 hardware engine 30 generates log information indicating the contents of the error of the add-on command (#0 add-on command), transfers the generated log information to the log area (#0 log area) 105 of the host 10 via DMA, and notifies the command manager 202 that the execution of the processing of the request command 140 was completed based on an error.

Thereafter, the command manager 202 notifies the host 10 that the execution of the processing requested in the request command 140 was completed based on an error. In the foregoing case, the command reentry control unit 106 of the host 10 refers to the log information stored in the log area (#0 log area) 105, confirms the contents of the error, corrects the error location of the add-on command (#0 add-on command stored in the command storage area (#0 command storage area) 103, and thereafter executes processing for reentering the request command 140. For example, the command reentry control unit 106 resends the transfer request to the SSD controller 20, and thereafter reissues the hardware engine request command 140, to which the second identifying information, in response to the acquisition request from the SSD controller 20.

Moreover, the hardware engine 30 that received the request command 140, for instance, the #1 hardware engine 30, activates the DMA, acquires, from the host 10, the add-on command (#1 add-on command) stored in the command storage area (#1 command storage area) 103 of the host 10 based on the address 154 of the host 10 storing the add-on command in the high order area 150 of the request command 140, analyzes the contents of the acquired add-on command (#1 add-on command), and determines whether an error was detected in the contents of the add-on command (#1 add-on command), such as a problem with the setting.

When the #1 hardware engine 30 did not detect an error in the contents of the acquired add-on command (#1 add-on command), the #1 hardware engine 30 requests the command manager 202 to transfer the data required for the processing, such as database retrieval processing, to be performed according to the contents of the acquired add-on command. In the foregoing case, the command manager 202 that received the data transfer request refers to the read start address 157 of data stored in the SSD 40 and the data size 150 of the SSD 40 in the high order area 150 of the request command 140, reads the data from one of the SSDs 40, transfers the read data to the DRAM 50, temporarily retains the transferred data in the DRAM 50, and thereafter transfers the data retained in the DRAM 50 to the #1 hardware engine 30.

The #1 hardware engine 30 that received the data transferred from the DRAM 50 activates data processing, executes graph processing according to the contents of the add-on command, transfers the execution result to the result area (#1 result area) 104 of the host 10 via DMA, and thereafter notifies the command manager 202 of the completion of execution of the request command 140. The command manager 202 that received the execution completion notice of the request command 140 notifies the host 10 of the completion of execution of the request command 140.

Meanwhile, when an error is detected in the contents of the acquired add-on command (#1 add-on command), the #1 hardware engine 30 generates log information indicating the contents of the error of the add-on command (#1 add-on command), transfers the generated log information to the log area (#1 log area) 105 of the host 10 via DMA, and notifies the command manager 202 that the execution of the processing of the request command 140 was completed based on an error. Thereafter, the command manager 202 notifies the host 10 that the execution of the processing requested in the request command 140 was completed based on an error. In the foregoing case, the command reentry control unit 106 of the host 10 refers to the log information stored in the log area (#1 log area) 105, confirms the contents of the error, corrects the error location of the add-on command (#1 add-on command stored in the command storage area (#1 command storage area) 103, and thereafter executes processing for reentering the request command 140. For example, the command reentry control unit 106 resends the transfer request to the SSD controller 20, and thereafter reissues the hardware engine request command 140, to which the second identifying information, in response to the acquisition request from the SSD controller 20.

Figure 10:
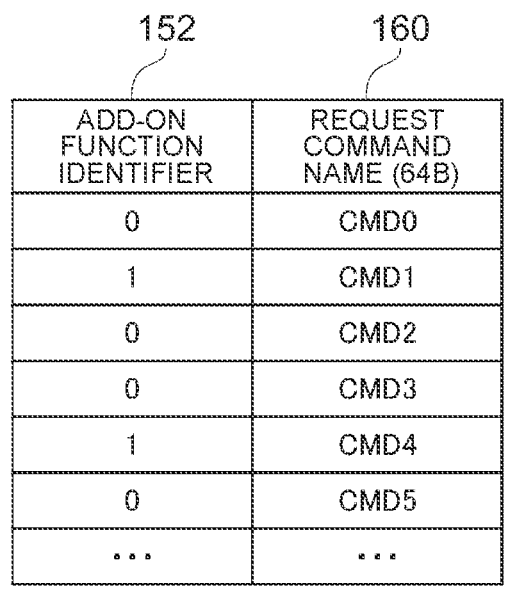
FIG. 10 is a configuration diagram showing the relevant part of the hardware engine request command.

FIG. 10 is a configuration diagram showing the relevant part of the hardware engine request command. In FIG. 10, when the host 10 is to sequentially issue the #0, #2, #3 request commands 140 as the request command (hardware engine request command) to the three hardware engines (#0, #2, #3 hardware engines) 30 having the #A function among the five hardware engines 30 having two types of functions (#A, #B), "0" is added to the add-on function identifier 152 of the #0, #2, #3 request commands 140 as information indicating that the #0, #2, #3 hardware engines 30 have the #A function. Moreover, information of "CMD0", "CMD2", "CMD3" is each added to the #0, #2, #3 request commands 140 as the request command name 160.

Meanwhile, when the host 10 is to sequentially issue the #1, #4 request commands 140 as the request command (hardware engine request command) to the two hardware engines (#1, #4 hardware engines) 30 having the #B function among the five hardware engines 30 having two types of functions (#A, #B), "1" is added to the add-on function identifier 152 of the #1, #4 request commands 140 as information indicating that the #1, #4 hardware engines 30 have the #B function. Moreover, information of "CMD1", "CMD4" is each added to the #1, #4 request commands 140 as the request command name 160.

Figure 11:
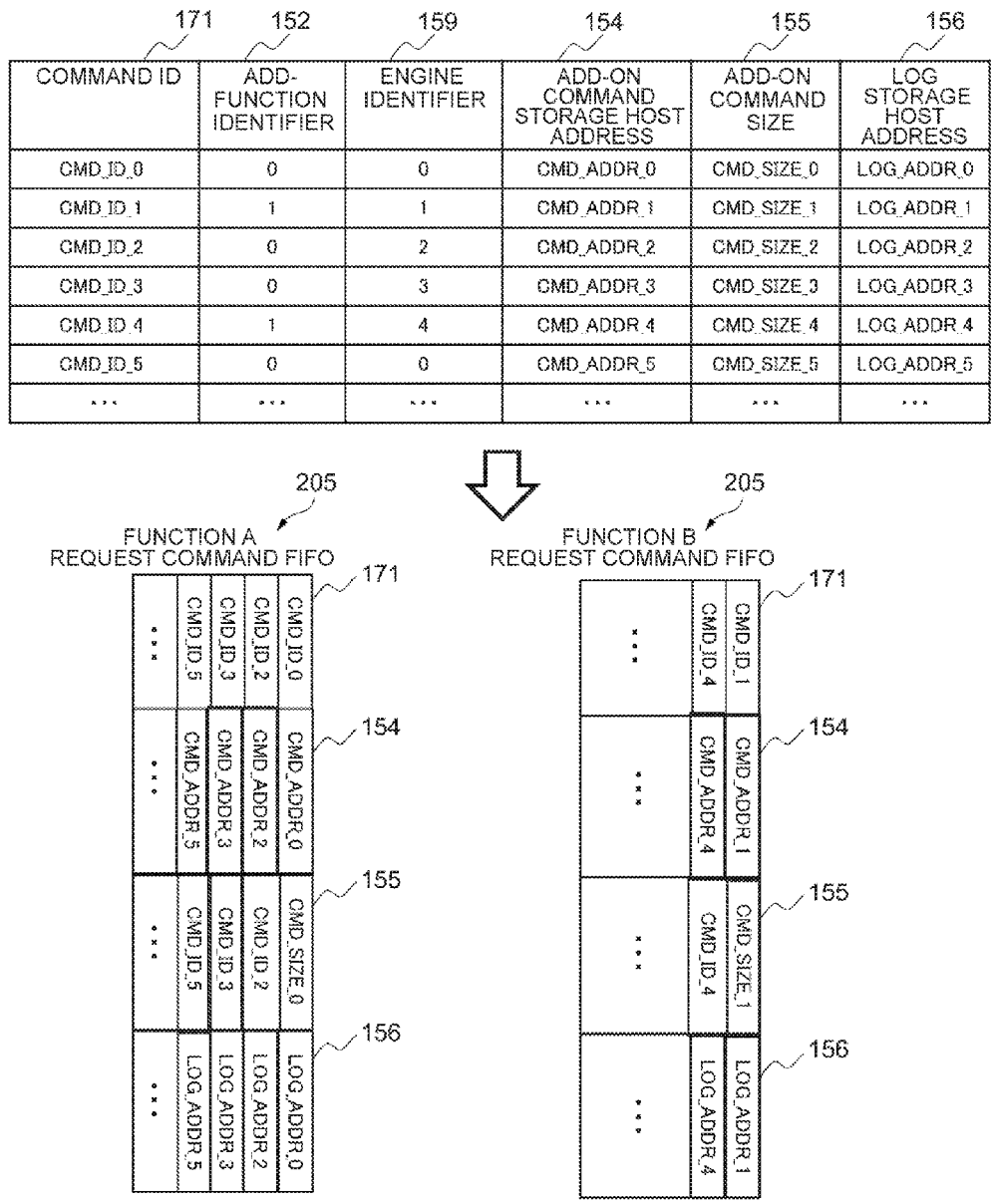
FIG. 11 is a conceptual diagram explaining the configuration of the hardware engine request command and the request command FIFO.

FIG. 11 is a conceptual diagram explaining the configuration of the hardware engine request command and the request command FIFO.

In FIG. 11, when the host 10 is to sequentially issue the #0, #2, #3 request commands 140 as the request command (hardware engine request command) to the three hardware engines (#0, #2, #3 hardware engines) 30 having the #A function among the five hardware engines 30 having two types of functions (#A, #B), "0", "2", "3" is each added to the end of the command ID of the command ID 171 of the #0, #2, #3 request commands 140 as information for identifying the #0, #2, #3 request commands 140. Moreover, "0" is added to the add-on function identifier 152 of the #0, #2, #3 request commands 140 as information indicating that the #0, #2, #3 hardware engines 30 have the #A function. Furthermore, "0", "2", "3" is each added to the engine identifier 159 of the #0, #2, #3 request commands 140 as information for identifying the #0, #2, #3 hardware engines 30.

Moreover, among the #0, #2, #3 request commands 140, "0", "2", "3" is each added to the end of the address of the address 154 of the add-on command storage host as information which identifies the address of the #0, #2, #3 command storage areas 103, "0", "2", "3" is each added to the end of the size of the add-on command size 155 as information which identifies the size of the #0, #2, #3 add-on commands, and "0", "2", "3" is each added to the end of the address of the log storage host address 156 as information which identifies the address of the #0, #2, #3 log areas 105.

Meanwhile, when the host 10 is to sequentially issue the #1, #4 request commands 140 as the request command (hardware engine request command) to the two hardware engines (#1, #4 hardware engines) 30 having the #B function among the five hardware engines 30, "1", "4" is each added to the end of the command ID of the command ID 171 of the #1, #4 request commands 140 as information for identifying the #1, #4 request commands 140. Moreover, "1" is added to the add-on function identifier 152 of the #1, #4 request commands 140 as information indicating that the #1, #4 hardware engines 30 have the #B function. Furthermore, "1", "4" is each added to the engine identifier 159 of the #1, #4 request commands 140 as information for identifying the #1, #4 hardware engines 30.

Moreover, among the #1, #4 request commands 140, "1", "4" is each added to the end of the address of the address 154 of the add-on command storage host as information which identifies the address of the #1, #4 command storage areas 103, "1", "4" is each added to the end of the size of the add-on command size 155 as information which identifies the size of the "1", "4" add-on commands, and "1", "4" is each added to the end of the address of the log storage host address 156 as information which identifies the address of the "1", "4" log areas 105.

The request command 140 received by the command manager 202 is written in the #A request command FIFO 205 in the order that it was received. For example, when the command manager 202 receives the #0, #2, #3 request commands 140 in the order of #0, #2, #3, the #0, #2, #3 request commands 140 are written in the request command FIFO 205 in order from the #0 request command 140. The request command 140 written in the request command FIFO 205 is transferred to each hardware engine 30 in the order of #0, #2, #3. For instance, the #0 request command 140 is foremost transferred to the #0 hardware engine 30, the #2 request command 140 is then transferred to the #2 hardware engine 30, and the #3 request command 140 is thereafter transferred to the #3 hardware engine 30.

Moreover, the request command 140 received by the command manager 202 is written in the #B request command FIFO 205 in the order that it was received. For example, when the command manager 202 receives the #1, #4 request commands 140 in the order of #1, #4, the #1, #4 request commands 140 are written in the request command FIFO 205 in order from the #1 request command 140. The request command 140 written in the request command FIFO 205 is transferred to each hardware engine 30 in the order of #1, #4. For instance, the #1 request command 140 is foremost transferred to the #1 hardware engine 30, and the #4 request command 140 is thereafter transferred to the #4 hardware engine 30.

Note that the engine identifier 159 is used for identifying each hardware engine 30. In other words, when there is only one hardware engine 30, even when the number of the command ID 171 is set to a fixed number, the hardware engine 30 can be identified without having to use the engine identifier 159. Nevertheless, when there are a plurality of hardware engines 30, even when the number of the command ID 171 is set in order to a fixed number, it is not possible to identify each hardware engine 30 only with the command ID 171 which has been added to each request command 140 upon handling multiple request commands 140. Thus, when there are a plurality of hardware engines 30 having a plurality of functions, each hardware engine 30 is identified by using the engine identifier 159 corresponding to each hardware engine 30.

According to this embodiment, in addition to being able to yield the same effects as Embodiment 1, when there is a hardware engine 30 having two types of functions, the SSD controller 20 can manage the request commands 140 with two types of request command FIFOs 205.

Embodiment 4

In this embodiment, the error detection circuit 303 is provided with a command checking unit 306, an overflow checking unit 307 and a version checking unit 308.

Figure 12:
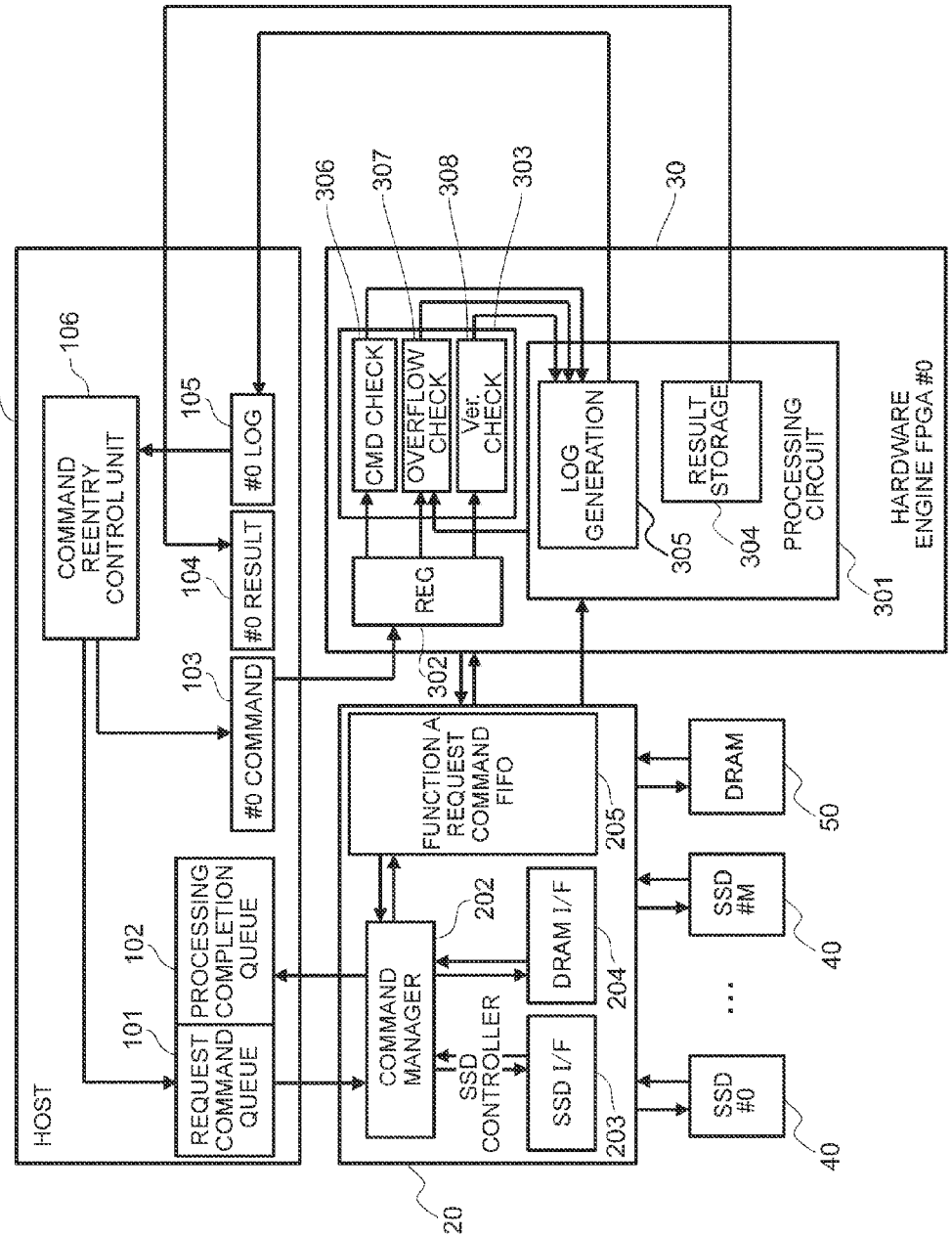
FIG. 12 is a configuration diagram showing a fourth embodiment of the storage system according to the present invention.

FIG. 12 is a configuration diagram showing a fourth embodiment of the storage system according to the present invention. In FIG. 12, this embodiment will explain a case where only one hardware engine (#0 hardware engine) 30 exists in order to facilitate the explanation. Note that there may be two or more hardware engines 30, or two or more types of hardware engines 30. Moreover, in correspondence to one hardware engine 30, the host 10 is provided with a #0 command storage area 103, a #0 result area 104 and a #0 log area 105, and the SSD controller 20 is provided with one request command FIFO 205 for managing the request commands 140 to the one hardware engine 30, but the remaining configuration is the same as Embodiment 1. Moreover, the host 10 is provided with a command reentry control unit 106 for controlling the reentry of the command 140.

As with Embodiment 2, the #0 hardware engine 30 is configured from a processing circuit 301 which executes data processing, such as database retrieval processing or graph processing, which is unique to each hardware engine 30, a register block 302 which stores the add-on commands acquired from the host 10 and the request commands 140 transferred from the SSD controller 20, and an error detection circuit 303 which detects whether there is an error in the contents of the add-on command or the request command 140 stored in the register block 302. The processing circuit 301 is provided with a result storage unit 304 for storing the processing result of the processing circuit 301, and a log generation unit 305 for generating log information.

The error detection circuit 303 is provided with a command checking unit 306, an overflow checking unit 307, and a version checking unit 308. The command checking unit 306 confirms each setting value of the add-on command (#0 add-on command) stored in the #0 command storage area, determines an error when each setting value is outside the range of values that can be handled by the #0 hardware engine 30, and transfers the determination result to the log generation unit 305. The overflow checking unit 307 determines an overflow error when the size of the data obtained from the processing of the processing circuit 301 exceeds the size of the #0 result area 104, or the log size of the log information generated by the log generation unit 305 may exceed the size of the #0 log area 105 in the host 10, and transfers the determination result to the log generation unit 305. The version checking unit 308 compares the add-on command version 151 recorded in the request command 140 and the version of the #0 hardware engine 30, determines a version error when the #0 hardware engine 30 is not a version that is supported by the add-on command, and transfers the determination result to the log generation unit 305.

Here, when the log generation unit 305 receives the determination result of an error from any one among the command checking unit 306, the overflow checking unit 307 or the version checking unit 308, the log generation unit 305 generates log information indicating the contents of the error as soon as it receives the determination result of an error, and transfers the generated log information to the log area (#0 log area) 105 of the host 10 via DMA. Note that the processing result of the processing circuit 301 is transferred from the result storage unit 304 to the result area (#0 result area) 104 of the host 10 via DMA.

Moreover, when an error result of the add-on command is stored in the log area (#0 log area) 105 of the host 10, the command reentry control unit 106 of the host 10 refers to the log information stored in the log area (#0 log area) 105, confirms the contents of the error, corrects the error location of the add-on command (#0 add-on command) stored in the command storage area (#0 command storage area) 103, and thereafter executes processing for reentering the request command 140. For example, the command reentry control unit 106 resends the transfer request to the SSD controller 20, and thereafter reissues the hardware engine request command 140, to which the second identifying information, in response to the acquisition request from the SSD controller 20.

Figures 13, 14:
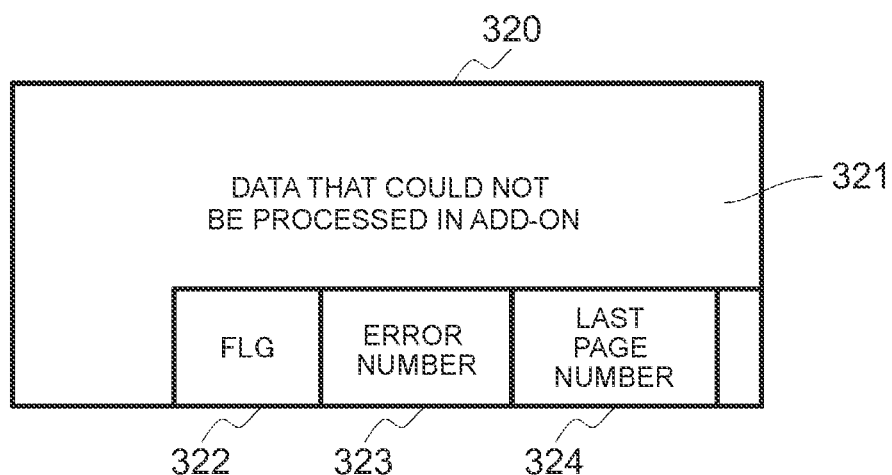
FIG. 13 is a configuration diagram showing the format of a log.
FIG. 14 is a configuration diagram showing the relation of the error number and the error description.

FIG. 13 is a configuration diagram showing the format of a log. In FIG. 13, the log 320 is configured from a line data 321 configured from the data that could not be processed by the processing circuit 301, a log completion flag 322 to be added to the line data 321, an error number 323 to be added to the line data 321, and a last page number 324 to be added to the line data 321. The log completion flag 322 stores information indicating whether the log is complete. The error number 323 stores the number for identifying the error. The last page number 324 stores the number of the last page among the plurality of pages that were processed by the processing circuit 301.

FIG. 14 is a configuration diagram showing the relation of the error number and the error description. In FIG. 14, information indicating the error description 325 is added to the log 320 in correspondence to the error number 323. For example, when the #0 hardware engine 30 is not a version that is supported by the add-on command, information of "unsupported add-on function version" is added to the #0 error number 323 as the error description 325. Moreover, when there is any flaw in the contents of the add-on command, information of "command flaw" is added to the #0 error number 323 as the error description 325. Furthermore, when the size of the data obtained from the processing of processing circuit 301 exceeds the size of the #0 result area 104, information of "host buffer overflow" is added to the #0 error number 323 as the error description 325.

According to this embodiment, in addition to being able to yield the same effects as Embodiment 1, the check results of the command checking unit 306, the overflow checking unit 307 and the version checking unit 308 can be notified to the host 10.

Embodiment 5

In this embodiment, the hardware engine 30 functions as a database retrieval engine.

Figure 15:
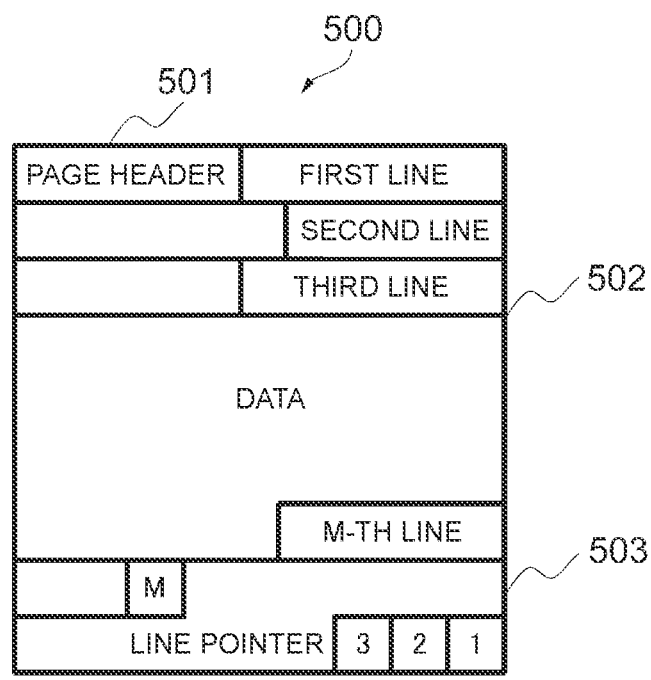
FIG. 15 is a configuration diagram showing the format of a database.

FIG. 15 is a configuration diagram showing the format of a database. With the database 500 shown in FIG. 15, the hardware engine 30 is configured as a relational database (RDB) to be processed upon functioning as a database retrieval engine, and stored in the DRAM 50. The database 500 is configured in page units, and each page is configured from a page header 501, a data area 502, and a line pointer 503. The data area 502 is configured from a plurality of lines (first line to M-th line), and data is recorded in each line. The hardware engine 30 having a function as a database retrieval engine uses the data area 502 and the line pointer 503 in the database 500 as the retrieval targets.

Figure 16:
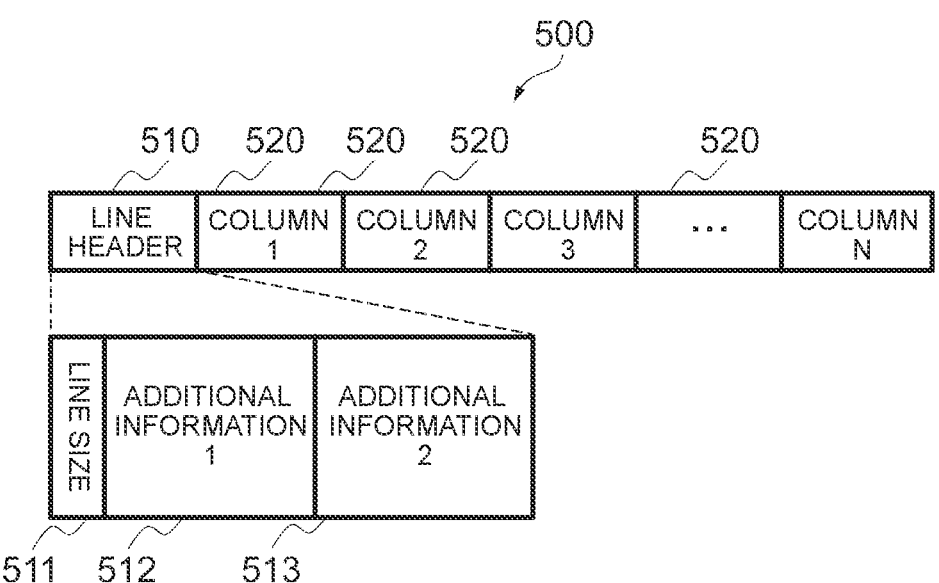
FIG. 16 is a configuration diagram showing the format of a database.

FIG. 16 is a configuration diagram showing the format of a database. In FIG. 16, each line configuring the data area 502 of the database 500 is configured from a line header 510, and #1 to #N column data 520. The line header 501 is configured from a line size 511, first additional information 512, and second additional information 513.

The first additional information 512 or the second additional information 513 is configured, for example, from a line format of PostgreSQL, and the first additional information 512 or the second additional information 513 stores information such as a line generation transaction ID or a line deletion transaction ID.

The command manager 202 reads, in page units, the data of the database 500 stored in the DRAM 50, and transfers the read data in page units to the hardware engine 30. The hardware engine 30 processes the data in page units as data to be retrieved based on the add-on command.

Figure 17:
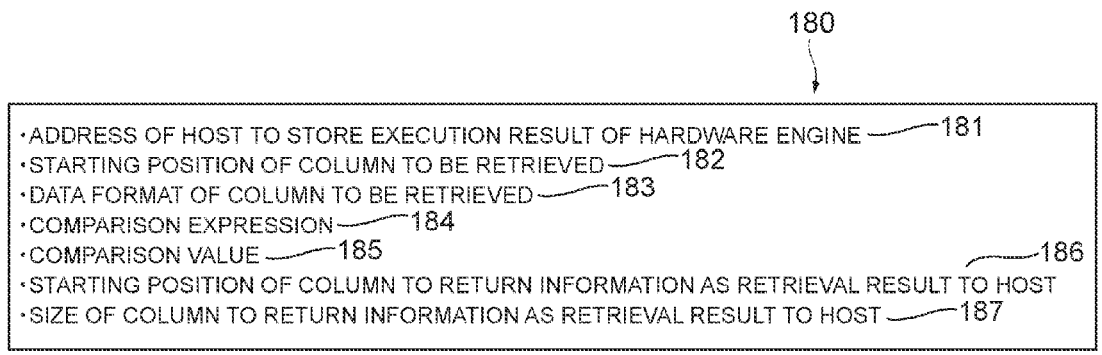
FIG. 17 is a configuration diagram of the add-on command.

FIG. 17 is a configuration diagram of the add-on command. In FIG. 17, when the hardware engine 30 is to be used as the database retrieval engine, the add-on command 180 stores information of 2 KB which includes an address 181 of the host storing the execution result of the hardware engine 30, a starting position 182 of the column to be retrieved, a data format 183 of the column to be retrieved, a comparison expression 184 of the column to be retrieved, a comparison value 185 of the column to be retrieved, a starting position 186 of the column to be returned to the host 10 as the retrieval result, and a size 187 of the column to be returned to the host 10 as the retrieval result. In the foregoing case, the comparison expression 184 and the comparison value 185 are used as the retrieval conditions.

Figure 18:
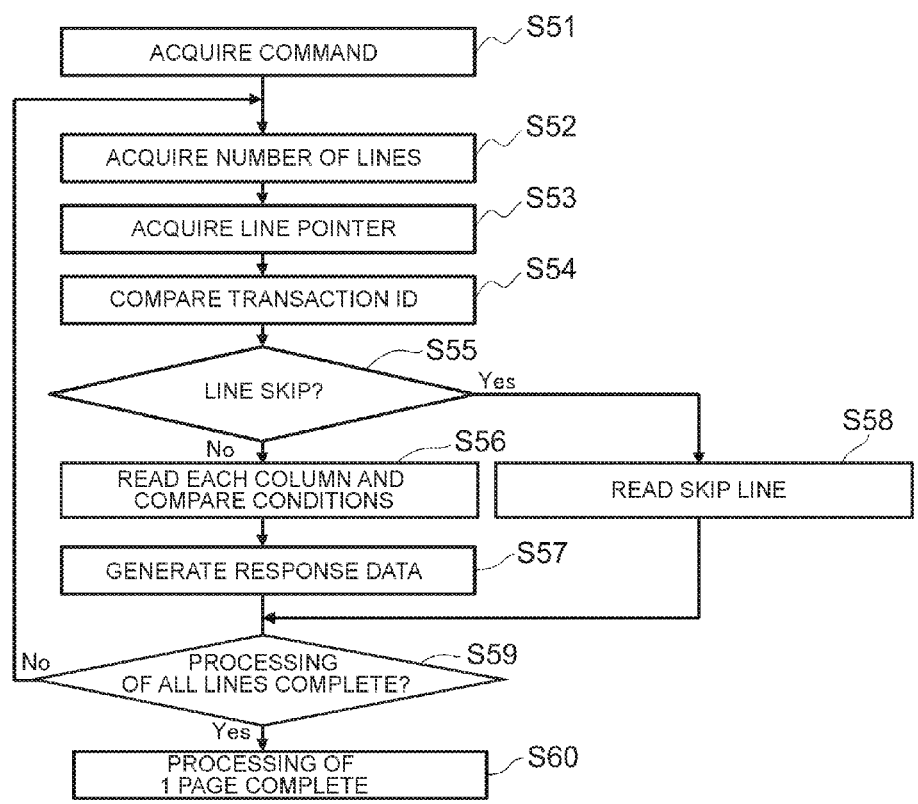
FIG. 18 is a flowchart explaining the database retrieval processing performed by the hardware engine.

FIG. 18 is a flowchart explaining the database retrieval processing performed by the hardware engine. This processing is started on the condition that the hardware engine 30 as the database retrieval engine receives a hardware engine request command 140 from the command manager 202 of the SSD controller 20.

In FIG. 18, with the hardware engine 30 that received the hardware engine request command 140, the processing circuit 301 starts the database retrieval processing. Foremost, the processing circuit 301 acquires the add-on command 180 via DMA from the host 10 based on the address 154 of the host 10 storing the add-on command in the high order area 150 of the request command 140, and retains the contents of the acquired add-on command 180 in the register block 302 (S51).

Next, the processing circuit 301 refers to the database 500 transferred from the DRAM 50, acquires the number of lines from the page header 501 of the first page of the database 500 (S52), then sequentially acquires, from the first line, the line pointer 503 of the first page of the database 500 (S53), thereafter compares the information (line generation transaction ID, line deletion transaction ID) recorded in the first additional information 512 or the second additional information 513 with the contents of the line data of the first page as the transaction ID comparison processing (S54), and determines whether to perform a line skip in cases where the contents of the line data of the first page have been changed (S55).

When the processing circuit 301 obtains a negative determination result in step S55; that is, when there is no change in the contents of the line data of the first page, the processing circuit 301 reads the data of each column of the first page of the database 500, compares the read data of each column with the retrieval conditions (comparison expression 184 and comparison value 185) recorded in the add-on command 180 (S56), extracts data which satisfies the retrieval conditions among the read data of each column and generates response data (S57), and then proceeds to the processing of step S59.

Meanwhile, when a positive determination result is obtained in step S55; that is, when the contents of the line data of the first page have been changed, the processing circuit 301 writes data belonging to the line to be skipped as the data for generating log information (S58), and then proceeds to the processing of step S59.

Next, the processing circuit 301 determines whether the processing of all lines of the first page is complete (S59). Upon obtaining a negative determination result in step S59, the processing circuit 301 returns to the processing of step S52 and repeats the processing of step S52 to step S59, and upon obtaining a positive determination result in step S59, the processing circuit 301 completes the processing of one page (S60), and then ends the processing in this routine.

Thereafter, the processing circuit 301 executes the processing of steps S52 to S60 for all pages, and transfers, via DMA, the response data generated in step S57 to the result area 104 of the host 10 as the execution result (retrieval result). Moreover, the processing circuit 301 generates log information based on the data written in step S58, and transfers the generated log information to the log area 105 of the host 10 via DMA.

According to this embodiment, the hardware engine 30 can execute data retrieval processing to the data transferred from the SSD controller 20 based on the add-on command 180 acquired from the host 10, and notify the execution result to the host 10.

Note that the present invention is not limited to the embodiments described above, and also covers various modified examples. For example, the information (first auxiliary access information to third auxiliary access information) recorded in the high order area 150 among the information to be added to the request command 140 may also be recorded in the add-on command. In the foregoing case, the host 10 may manage the add-on command by associating it with the command ID of the request command 140, and the hardware engine 30 may, in substitute for acquiring the add-on command via DMA transfer with the host 10, request the host 10 to transfer the add-on command corresponding to the command ID added to the request command 140, and request the SSD controller 20 to transfer the data required in the data processing based on the information added to the add-on command which was transferred from the host 10.

The foregoing embodiments were described in detail for explaining the present invention in an easy-to-understand manner, and the present invention is not necessarily limited to the configurations comprising all of the components. Moreover, a part of the configuration of a certain embodiment may be replaced with the configuration of another embodiment, and the configuration of a certain embodiment may be added to the configuration of another embodiment. Moreover, a different configuration may be added to, deleted from or replaced with a part of the configuration of the respective embodiments.

Moreover, a part or all of the respective configurations and functions described above may be realized with hardware such as by designing integrated circuits. Moreover, the respective configurations and functions described above may also be realized with software by a processor interpreting and executing the programs that realize the respective functions. Information such as programs, tables and files for realizing the respective functions may be recorded and stored in a storage device such as a memory, a hard disk, or an SSD (Solid State Drive), or in a recording medium such as an IC (Integrated Circuit) card, an SD (Secure Digital) memory card, or a DVD (Digital Versatile Disc).

REFERENCE SIGNS LIST

10: host
20: SSD controller
30: hardware engine
40: SSD
50: DRAM
101: request command queue
102: processing completion queue
103: command storage area
104: result area 105: log area
106: command reentry control unit
140: request command
180: add-on command
201: door bell register
202: command manager
203: SSD interface
204: DRAM interface
205: request command FIFO
206: command queue
301: processing circuit
302: register block
303: error detection circuit
304: result storage unit
305: log generation unit
306: command checking unit
307: overflow checking unit
308: version checking unit

The invention claimed is:

1. A storage apparatus, comprising:
a host computer including a processor a memory and an input/output (I/O) interface, the memory storing instructions that when executed configure the processor to manage a plurality of request commands, which are Non-Volatile Memory Express (NVMe) commands, which are defined according to an NVMe protocol and have a capacity of sixty four bytes, and one or more add-on commands, and control I/O of data to and from each of a plurality of storage devices which include at least a plurality of flash memories for storing data;
a controller including a memory, a processor and an I/O interface; and
one or more hardware engines which send and receive information to and from the host and the controller, each of the one or more hardware engines includes a memory, a processor, an I/O interface, a processing circuit, and a register block which stores the add-on commands acquired from the host and request commands transferred from a storage device of the plurality of storage devices,
wherein the memory of the controller stores instructions that when executed by the processor of the controller configures the processor to:
store a plurality of request commands acquired from the host in a command queue,
execute the plurality of request commands in the command queue in parallel and upon execution:
determine identifying information which has been added to the acquired request command and execute data I/O processing to the storage device according to the acquired request command upon determining that first identifying information has been added to the acquired request command, and,
upon determining that second identifying information has been added to the acquired request command, transfer the acquired request command to one of the hardware engines based on the acquired request command,
acquire data requested by the hardware engine from the storage device based on the acquired request command, and
transfer the acquired data to the hardware engine that made the request; and request,
wherein the memory of hardware engine that received the request command stores instructions that when executed by the processor of the hardware engine configure the processor to:
acquire the add-on command designated in the received request command from the host,
analyze the acquired add-on command,
request the controller to transfer data to be subject to processing of the add-on command based on the analysis result, and
upon receiving the data transferred by the controller, execute data processing to the received data based on the acquired add-on command.

2. The storage apparatus according to claim 1,
wherein main access information for accessing the storage device is added to the request command to which the first identifying information has been added; and
wherein first auxiliary access information which can be commonly used by the hardware engines and be used by the hardware engines for sending and receiving information to and from the host, second auxiliary access information which can be used by the controller for determining the hardware engine, and third auxiliary access information which can be used by the controller for acquiring data requested by the hardware engine are added to the request command to which the second identifying information has been added.

3. The storage apparatus according to claim 2,
wherein the first auxiliary access information:
is configured from a version of the add-on command, an address of the host for storing the add-on command, a size of the add-on command, and an address of the host for storing log information;
wherein the second auxiliary access information:
is configured from a function identifier for identifying a function of the hardware engine, a number of the hardware engines that are mounted, and an engine identifier for identifying the hardware engine; and
wherein the third auxiliary access information:
is configured from a read start address of data stored in the storage device, and a size of data stored in the storage device.

4. The storage apparatus according to claim 1,
wherein the controller is configured to execute:
a command manager which determines the identifying information of the request command stored in the command queue, and executes data I/O processing to the storage device or processing of transferring the request command stored in the command queue to one of the hardware engines according to the determination result, and
wherein the command manager:
upon receiving a data transfer request from one of the hardware engines, executes data I/O processing to the storage device based on information which has been added to the acquired request command, and transfers the data obtained in the data I/O processing to the hardware engine as a source of the data transfer request.

5. The storage apparatus according to claim 4,
wherein the storage device includes:
in addition to the flash memories, a data buffer which temporarily retains the data transferred from the flash memory;
wherein the command manager:
upon receiving a data transfer request from one of the hardware engines, executes data I/O processing to the flash memory based on information which has been added to the acquired request command, transfers the data in page units obtained in the data I/O processing to the data buffer, and thereafter transfers the data in page units retained in the data buffer to the hardware engine as a source of the data transfer request; and wherein the hardware engine:

executes data processing to the data in page units transferred from the command manager.

6. A data processing method of a storage apparatus comprising:
   a host computer including a processor a memory and an input/output (I/O) interface, the memory storing instructions that when executed configure the processor to manage a plurality of request commands, which are Non-Volatile Memory Express (NVMe) commands, which are defined according to an NVMe protocol and have a capacity of sixty four bytes, and one or more add-on commands, and control I/O of data to and from each of a plurality of storage devices which include at least a plurality of flash memories for storing data;
   a controller including a memory, a processor and an I/O interface; and
   one or more hardware engines which send and receive information to and from the host and the controller, each of the one or more hardware engines includes a memory, a processor, an I/O interface, a processing circuit, and a register block which stores the add-on commands acquired from the host and request commands transferred from a storage device of the plurality of storage devices,
   wherein the data processing method comprises:
   store a plurality of request commands acquired from the host in a command queue,
   execute the plurality of request commands in the command queue in parallel and upon execution:
   determining identifying information of the acquired request command;
   a second step of the controller executing data I/O processing to the storage device according to the acquired request command upon determining that first identifying information has been added to the acquired request command in the first step;
   a third step of the controller, upon determining that second identifying information has been added to the acquired request command in the first step, transferring the acquired request command to one of the hardware engines based on the acquired request command, thereafter acquiring data requested by the hardware engine from the storage device based on the acquired request command, and transferring the acquired data to the hardware engine;
   a fourth step of the hardware engine that received the request command acquiring an add-on command designated in the received request command from the host;
   a fifth step of the hardware engine that received the request command analyzing the acquired add-on command, and requesting the controller to transfer data to be subject to processing of the add-on command based on the analysis result; and
   a sixth step of the hardware engine that received the request, upon receiving the data to be subject to processing of the add-on command from the controller after the fifth step, executing data processing to the received data based on the acquired add-on command.

7. The data processing method of a storage apparatus according to claim 6,
   wherein main access information for accessing the storage device is added to the request command to which the first identifying information has been added; and
   wherein first auxiliary access information which can be commonly used by the hardware engines and be used by the hardware engines for sending and receiving information to and from the host, second auxiliary access information which can be used by the controller for determining the hardware engine, and third auxiliary access information which can be used by the controller for acquiring data requested by the hardware engine are added to the request command to which the second identifying information has been added.

8. The data processing method of a storage apparatus according to claim 7,
   wherein the first auxiliary access information:
   is configured from a version of the add-on command, an address of the host for storing the add-on command, a size of the add-on command, and an address of the host for storing log information;
   wherein the second auxiliary access information:
   is configured from a function identifier for identifying a function of the hardware engine, a number of the hardware engines that are mounted, and an engine identifier for identifying the hardware engine; and
   wherein the third auxiliary access information:
   is configured from a read start address of data stored in the storage device, and a size of data stored in the storage device.

9. The data processing method of a storage apparatus according to claim 6,
   wherein the controller includes:
   a command manager which determines the identifying information of the request command stored in the command queue, and executes data I/O processing to the storage device or processing of transferring the request command stored in the command queue to one of the hardware engines according to the determination result,
   wherein the data processing method further comprises:
   a seventh step of the command manager, upon receiving a data transfer request from one of the hardware engines, executing data I/O processing to the storage device based on the acquired request command, and transferring the data obtained in the data I/O processing to the hardware engine as a source of the data transfer request.

10. The data processing method of a storage apparatus according to claim 9,
    wherein the storage device includes:
    in addition to the flash memories, a data buffer which temporarily retains the data transferred from the flash memory;
    wherein the data processing method further comprises:
    an eighth step of the command manager, upon receiving a data transfer request from one of the hardware engines, executing data I/O processing to the flash memory based on the acquired request command, and transferring the data in page units obtained in the data I/O processing to the data buffer; and
    a ninth step of the command manger transferring the data in page units retained in the data buffer to the hardware engine as a source of the data transfer request after the eighth step; and
    wherein, in the sixth step, the hardware engine executes data processing to the data in page units transferred from the command manager.

11. A storage system, comprising:
    a host computer including a processor a memory and an input/output (I/O) interface, the memory storing instructions that when executed configure the processor to manage a plurality of request commands, which are Non-Volatile Memory Express (NVMe) commands, which are defined according to an NVMe protocol and have a capacity of sixty four bytes, and one or more add-on commands, and control I/O of data to and from each of a plurality of storage devices which include at least a plurality of flash memories for storing data;

a controller including a memory, a processor, and an I/O interface;

one or more hardware engines which send and receive information to and from the controller, each of the one or more hardware engines includes a memory, a processor, an I/O interface, a processing circuit, and a register block which stores the add-on commands acquired from the host and request commands transferred from a storage device of the plurality of storage devices; and wherein the memory of the controller stores instructions that when executed by the processor of the controller configures the processor to:

store a plurality of request commands acquired from the host in a command queue, execute the plurality of request commands in the command queue in parallel and upon execution:

determine identifying information of the acquired request command and execute data I/O processing to the storage device according to the acquired request command upon determining that first identifying information has been added to the acquired request command, and, upon determining that second identifying information has been added to the acquired request command, transfer the acquired request command to one of the hardware engines based on the acquired request command, acquire data requested by the hardware engine from the storage device based on the acquired request command, and transfer the acquired data to the hardware engine; and wherein the memory of the hardware engine that received the request command stores instructions that when executed by the processor of the hardware ermine configure the processor to:

acquire an add-on command from the host according to the received request command, analyze the acquired add-on command, request the controller to transfer data to be subject to processing of the add-on command based on the analysis result, and, upon receiving the data transferred by the controller, execute data processing to the received data based on the acquired add-on command and transfers the execution result to the host.

12. The storage system according to claim 11, wherein main access information for accessing the storage device is added to the request command to which the first identifying information has been added; and wherein first auxiliary access information which can be commonly used by the hardware engines and be used by the hardware engines for sending and receiving information to and from the host, second auxiliary access information which can be used by the controller for determining the hardware engine, and third auxiliary access information which can be used by the controller for acquiring data requested by the hardware engine are added to the request command to which the second identifying information has been added.

13. The storage system according to claim 12, wherein the first auxiliary access information:

is configured from a version of the add-on command, an address of the host for storing the add-on command, a size of the add-on command, and an address of the host for storing log information;

wherein the second auxiliary access information:

is configured from a function identifier for identifying a function of the hardware engine, a number of the hardware engines that are mounted, and an engine identifier for identifying the hardware engine; and wherein the third auxiliary access information:

is configured from a read start address of data stored in the storage device, and a size of data stored in the storage device.

14. The storage system according to claim 11, wherein the host includes:

a command storage area for storing the add-on command, a result area for storing a processing result of the hardware engine, and a log area for storing log information which is transferred from the hardware engine;

wherein the hardware engine includes:

a command acquisition circuit which, upon receiving the request command from the controller, acquires the designated add-on command from the command storage area of the host based on the received request command;

a register block which stores the add-on command acquired by the command acquisition circuit;

a processing circuit which analyzes the add-on command stored in the register block, sends a data transfer request to the controller based on the analysis result, and thereafter executes data processing to be performed to the data transferred from the controller; and an error detection circuit which detects whether there is an error in contents of the add-on command stored in the register block;

wherein the processing circuit includes:

a result storage unit which stores a processing result of the data processing, and transfers the stored processing result to the result storage area of the host; and a log generation unit which, upon the error detection circuit detecting that there is an error in the contents of the add-on command, generates, as log information, at least either the contents of the error of the add-on command or a log of the data that could not be processed in the data processing, and transfers the generated log information to the log area of the host.

15. The storage system according to claim 14, wherein the host includes:

a command reentry control unit which executes processing, in cases where log information indicating the contents of the error of the add-on command exists in the log information stored in the log area, of correcting the error of the add-on command stored in the command storage area, and reissuing, to the controller, the request command to which the second identifying information has been added.

* * * * *